(12) United States Patent
Lee et al.

(10) Patent No.: US 7,934,387 B2
(45) Date of Patent: May 3, 2011

(54) AIR CONDITIONER

(75) Inventors: Sung-Hwan Lee, Changwon-si (KR);
Kam-Gyu Lee, Busan-si (KR);
Dong-Jin Kim, Wonjoo-si (KR); Ju-Ho Ock, Masan-si (KR)

(73) Assignee: LG Electronics Inc., Seoul (KR)

( * ) Notice: Subject to any disclaimer, the term of this patent is extended or adjusted under 35 U.S.C. 154(b) by 340 days.

(21) Appl. No.: 12/084,057

(22) PCT Filed: Nov. 9, 2006

(86) PCT No.: PCT/KR2006/004678
§ 371 (c)(1),
(2), (4) Date: Apr. 24, 2008

(87) PCT Pub. No.: WO2007/061191
PCT Pub. Date: May 31, 2007

(65) Prior Publication Data
US 2009/0282853 A1 Nov. 19, 2009

(30) Foreign Application Priority Data

| Nov. 23, 2005 | (KR) | 10-2005-0112615 |
| Apr. 5, 2006 | (KR) | 10-2006-0031008 |
| Apr. 5, 2006 | (KR) | 10-2006-0031013 |
| Apr. 6, 2006 | (KR) | 10-2006-0031462 |

(51) Int. Cl.
*F24F 3/16* (2006.01)
(52) U.S. Cl. ............... 62/259.1; 62/78; 62/428; 422/28; 422/120; 422/305; 435/299.1; 454/156
(58) Field of Classification Search ........... 62/78, 259.1, 62/428–429; 422/1, 28, 120, 123, 124, 305, 422/306; 435/266, 299.1; 454/156; 524/9–26
See application file for complete search history.

(56) References Cited

U.S. PATENT DOCUMENTS

| 2,217,204 | A | * | 10/1940 | Jalma | 62/78 |
| 2,780,932 | A | * | 2/1957 | Kuentz | 66/115 |
| 5,326,315 | A | * | 7/1994 | Inoue et al. | 454/126 |
| 6,363,734 | B1 | * | 4/2002 | Aoyagi | 62/264 |
| 6,487,868 | B2 | * | 12/2002 | Sato et al. | 62/176.1 |
| 6,506,428 | B1 | * | 1/2003 | Berge et al. | 426/66 |
| 6,557,356 | B2 | * | 5/2003 | Underwood | 62/78 |
| 6,991,532 | B2 | * | 1/2006 | Goldsmith | 454/156 |
| 7,740,686 | B2 | * | 6/2010 | Metteer | 95/58 |
| 2008/0254080 | A1 | * | 10/2008 | Glynson et al. | 424/404 |

FOREIGN PATENT DOCUMENTS

| EP | 0 625 678 A1 | * | 4/1994 |
| JP | 63-306340 | | 12/1988 |
| JP | 3-267635 | | 11/1991 |
| JP | 8-145394 | | 6/1996 |
| JP | 9-59103 | | 3/1997 |
| JP | 2003-97826 | | 4/2003 |
| JP | 2005-512591 | | 5/2005 |
| JP | 2005-308356 | | 11/2005 |
| KR | 10-2004-0092899 | | 11/2004 |
| KR | 10-2005-0087741 | | 8/2005 |

* cited by examiner

*Primary Examiner* — William E Tapolcai
(74) *Attorney, Agent, or Firm* — McKenna Long & Aldridge LLP

(57) ABSTRACT

An air conditioner is provided. The air conditioner includes a main body formed by a plurality of members assembled with each other and an air passage along which air introduced into the main body flows. At least one of the member includes a Kimchi lactic bacterium zymogenic material formed on a portion of the member, which contacts the air flowing along the air passage.

30 Claims, 16 Drawing Sheets

[Fig. 1]
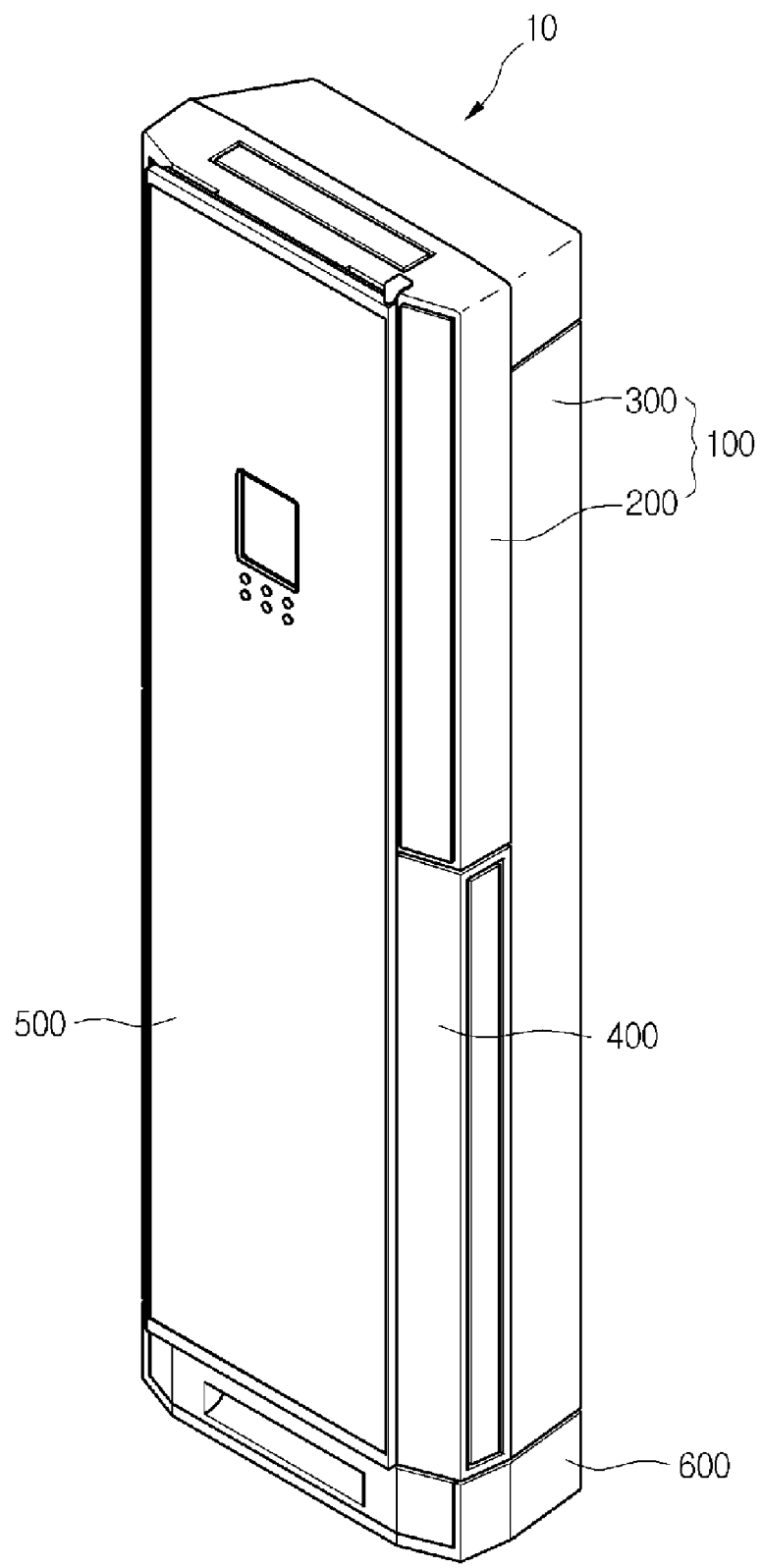

[Fig. 2]
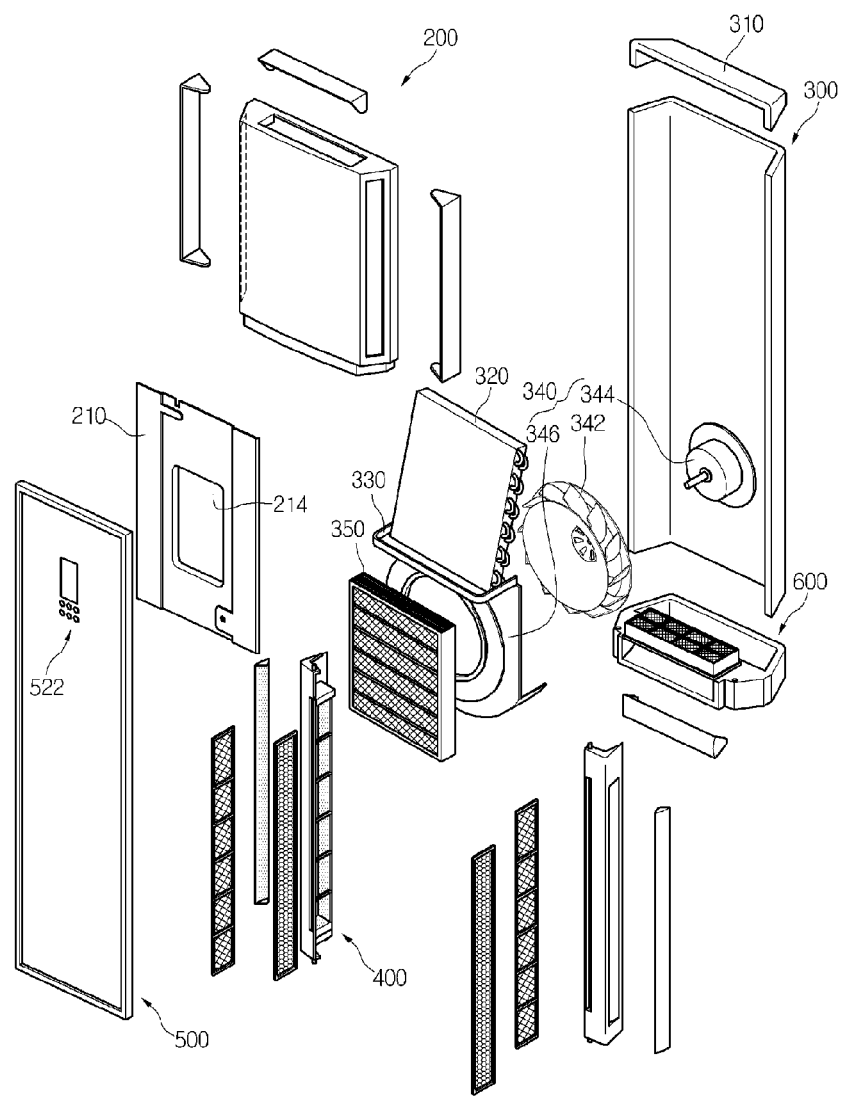
[Fig. 3]
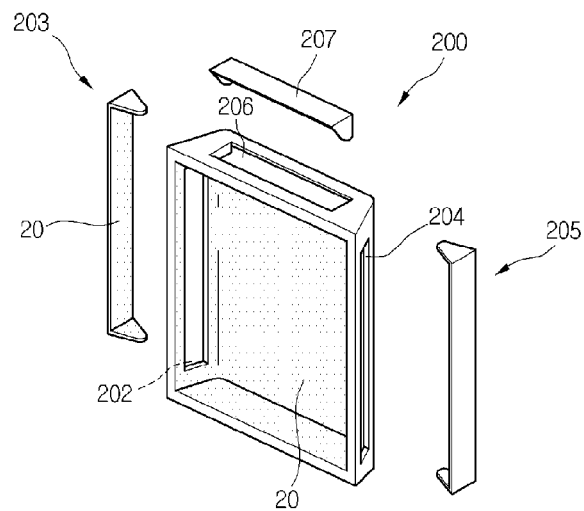

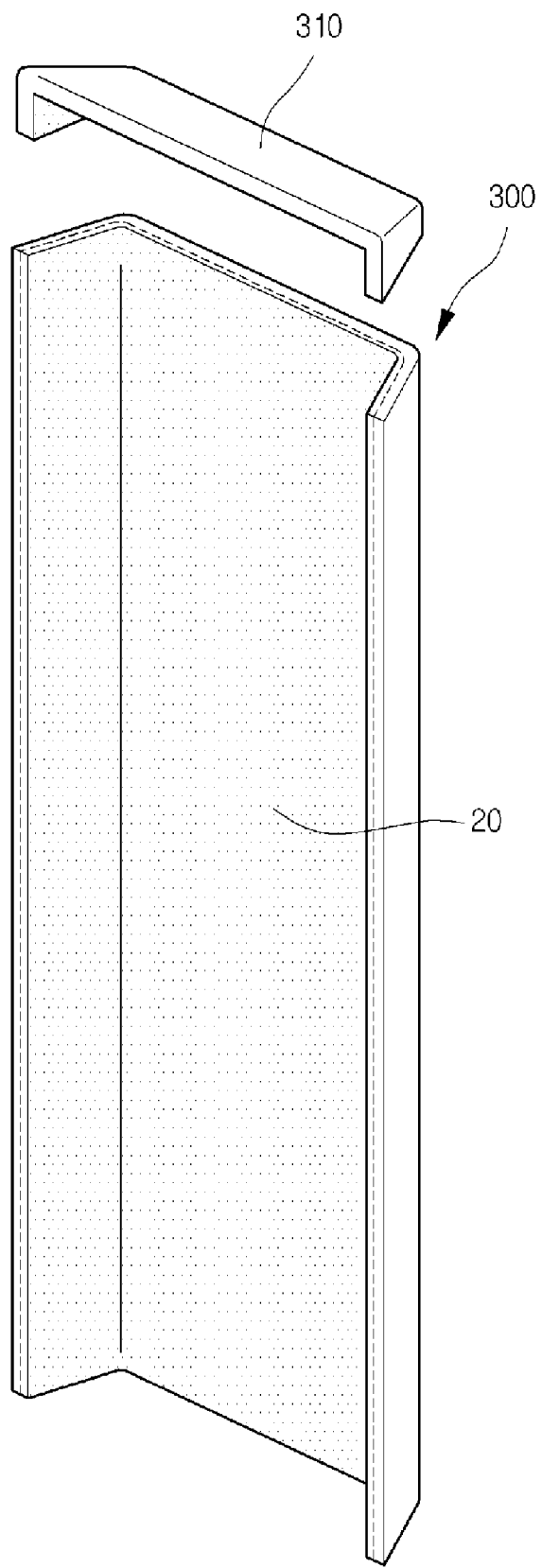
[Fig. 4]

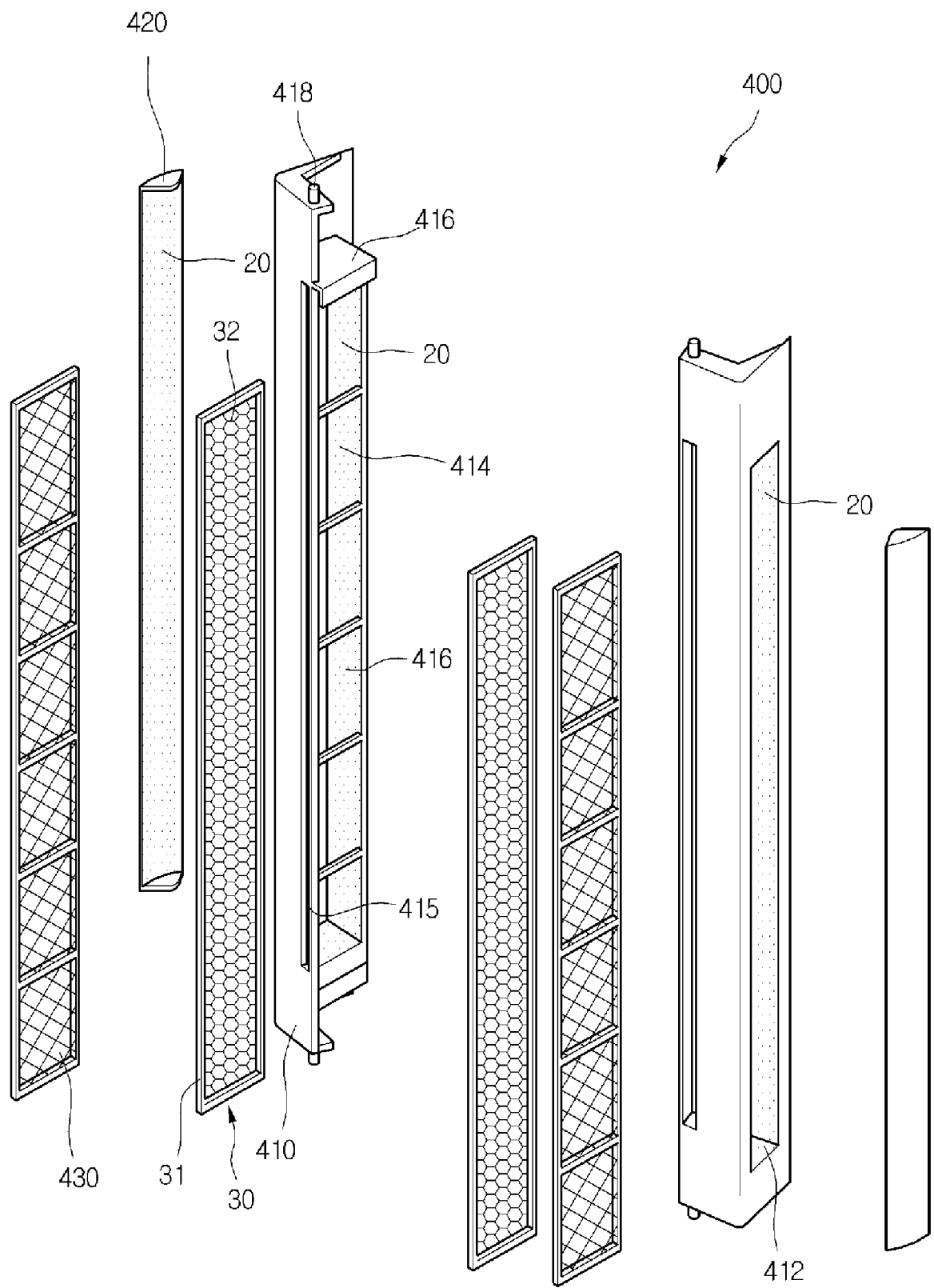
[Fig. 5]

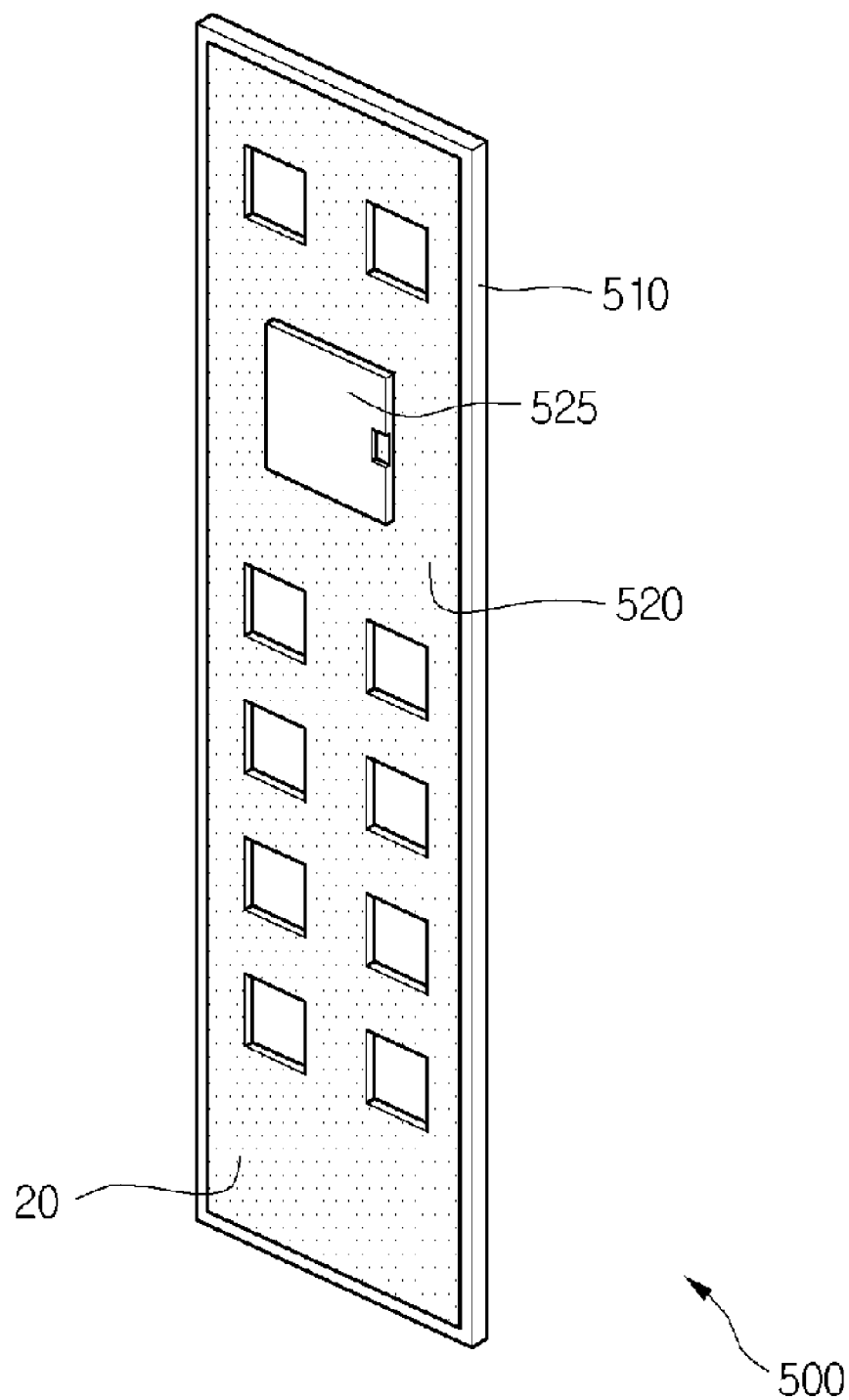
[Fig. 6]

[Fig. 7]
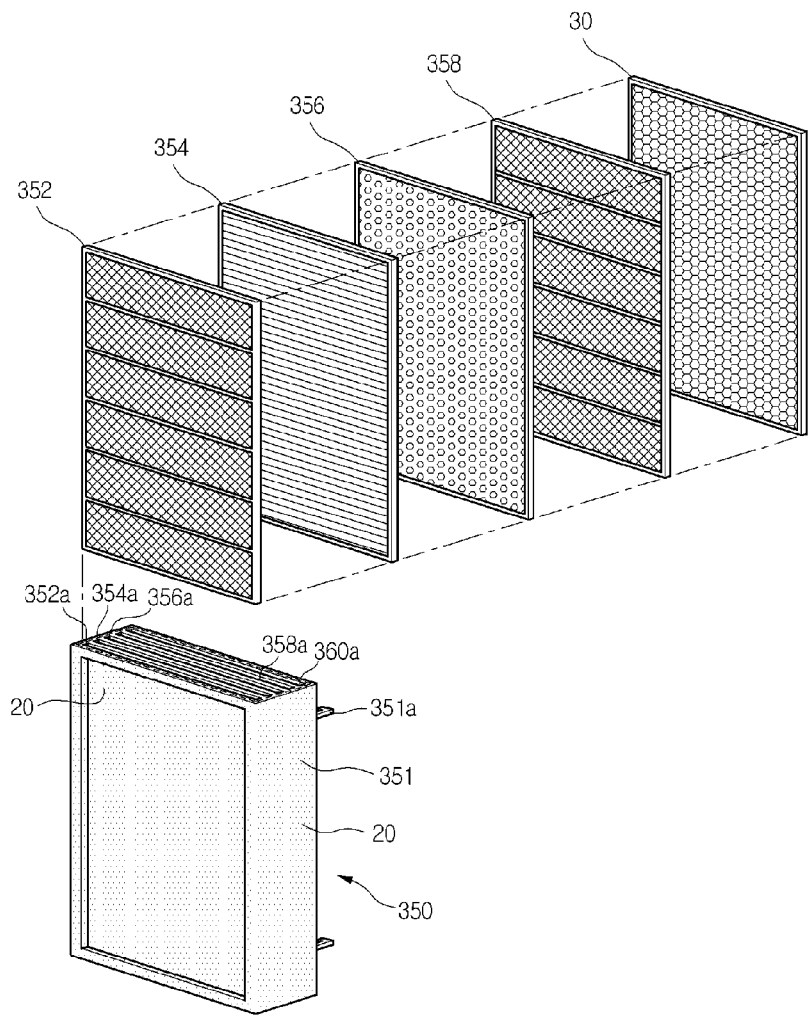
[Fig. 8]
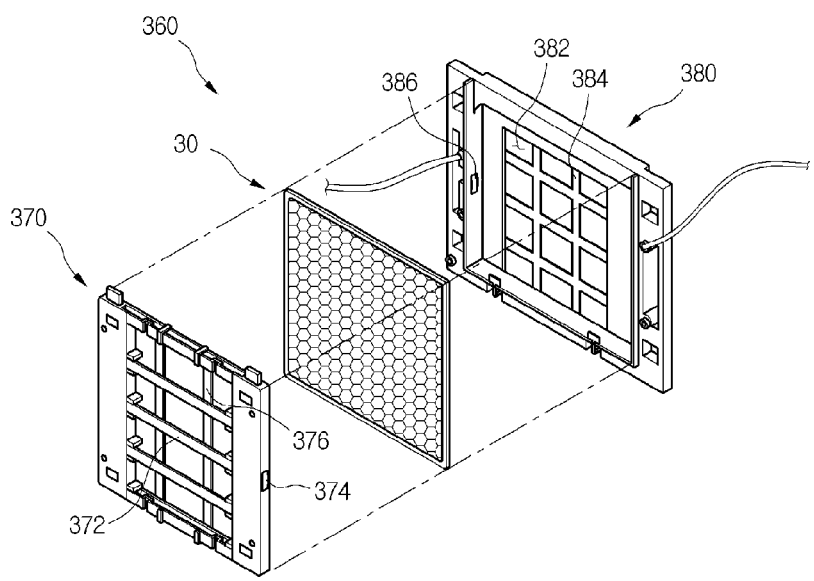

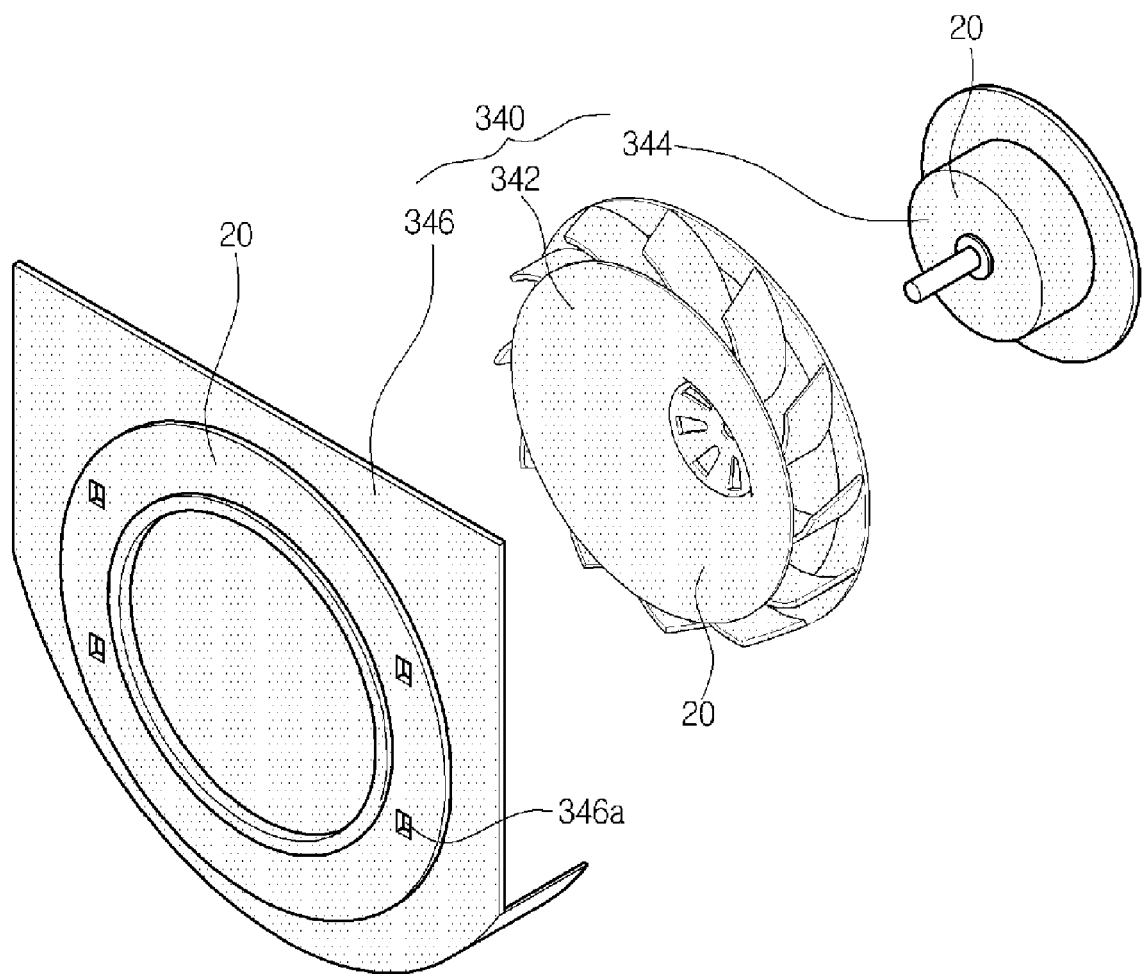
[Fig. 9]

[Fig. 10]
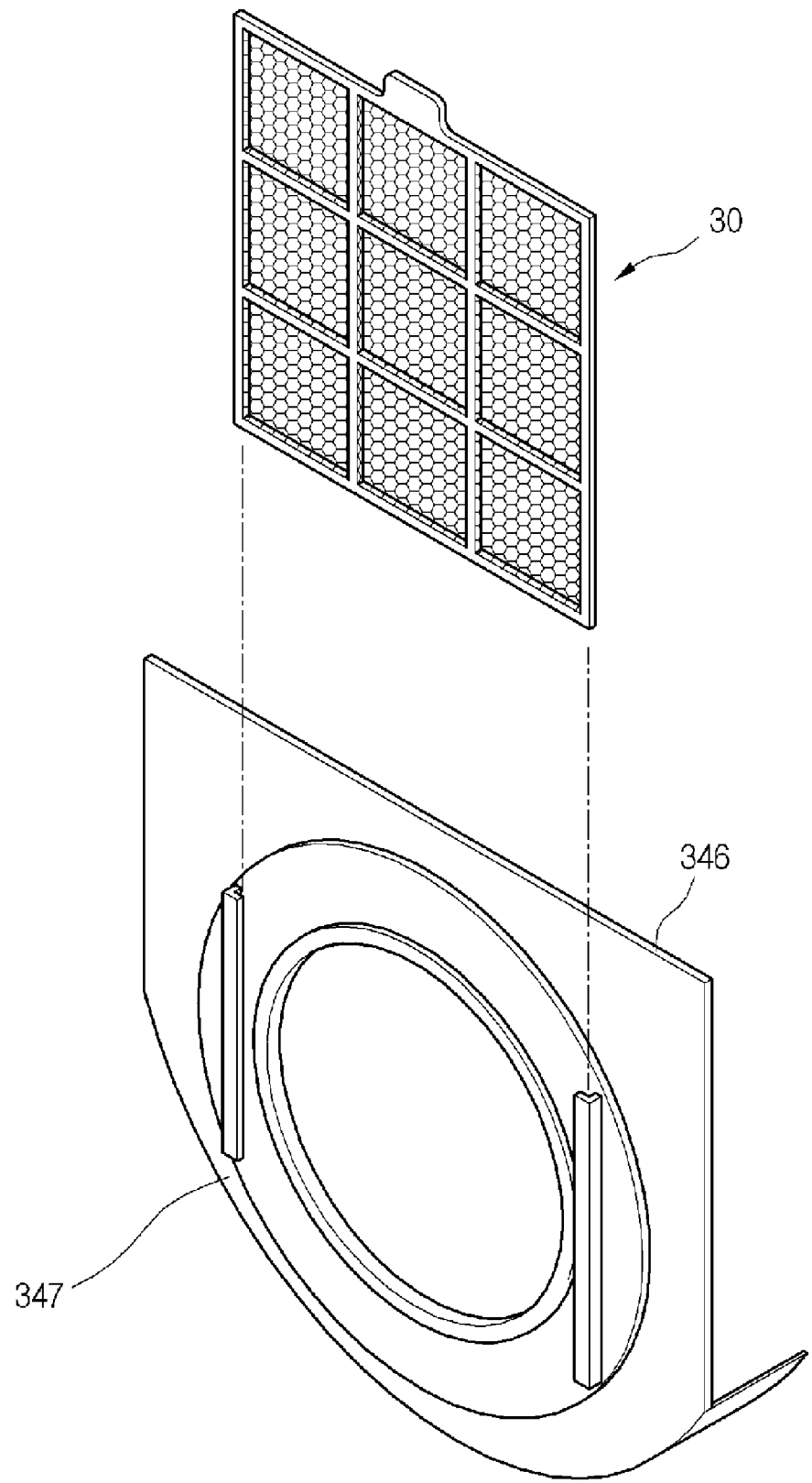

[Fig. 11]
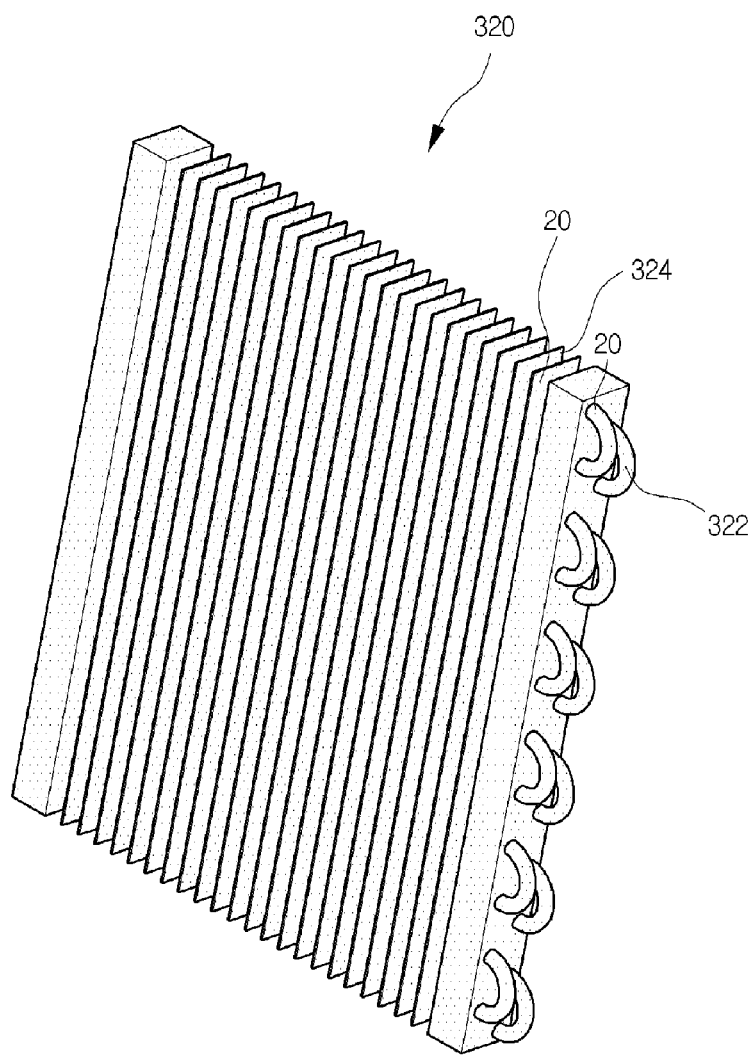
[Fig. 12]
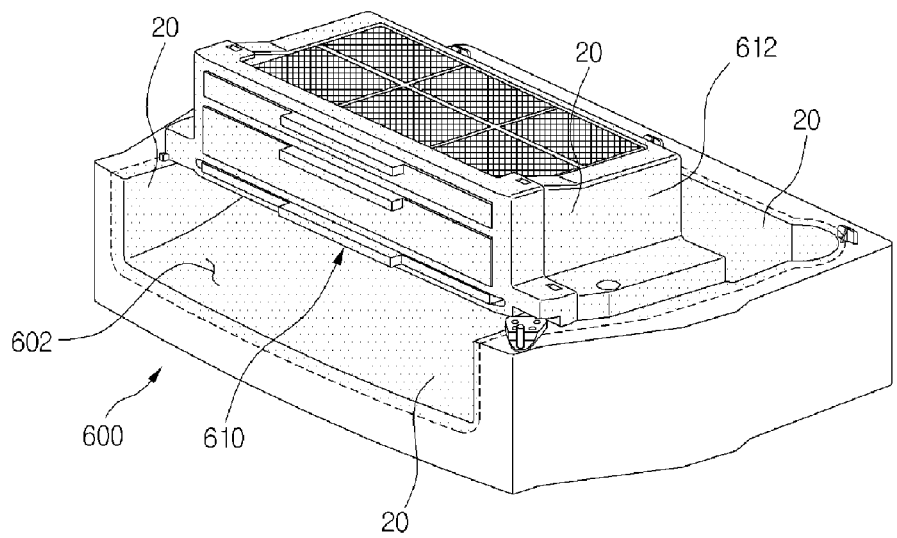

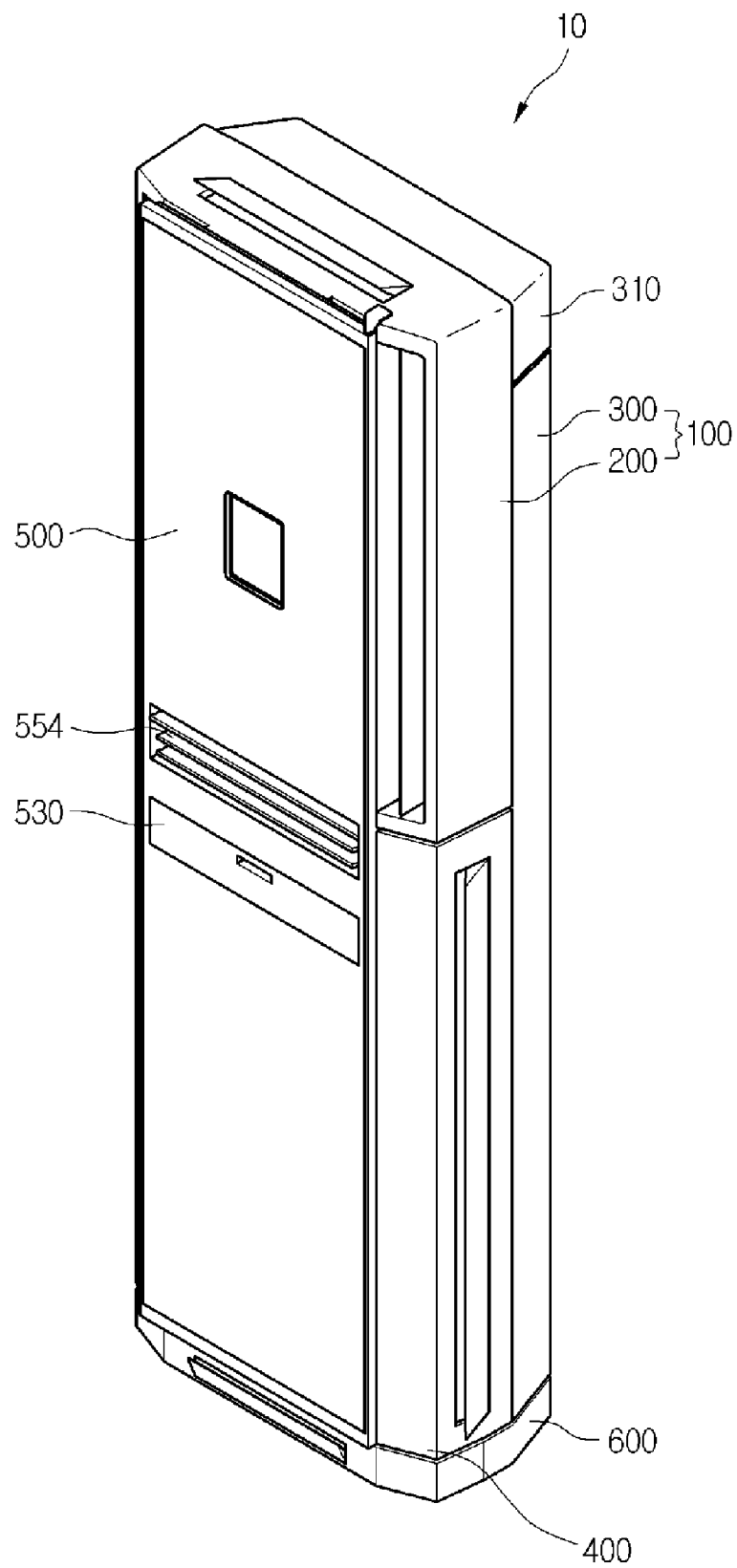
[Fig. 13]

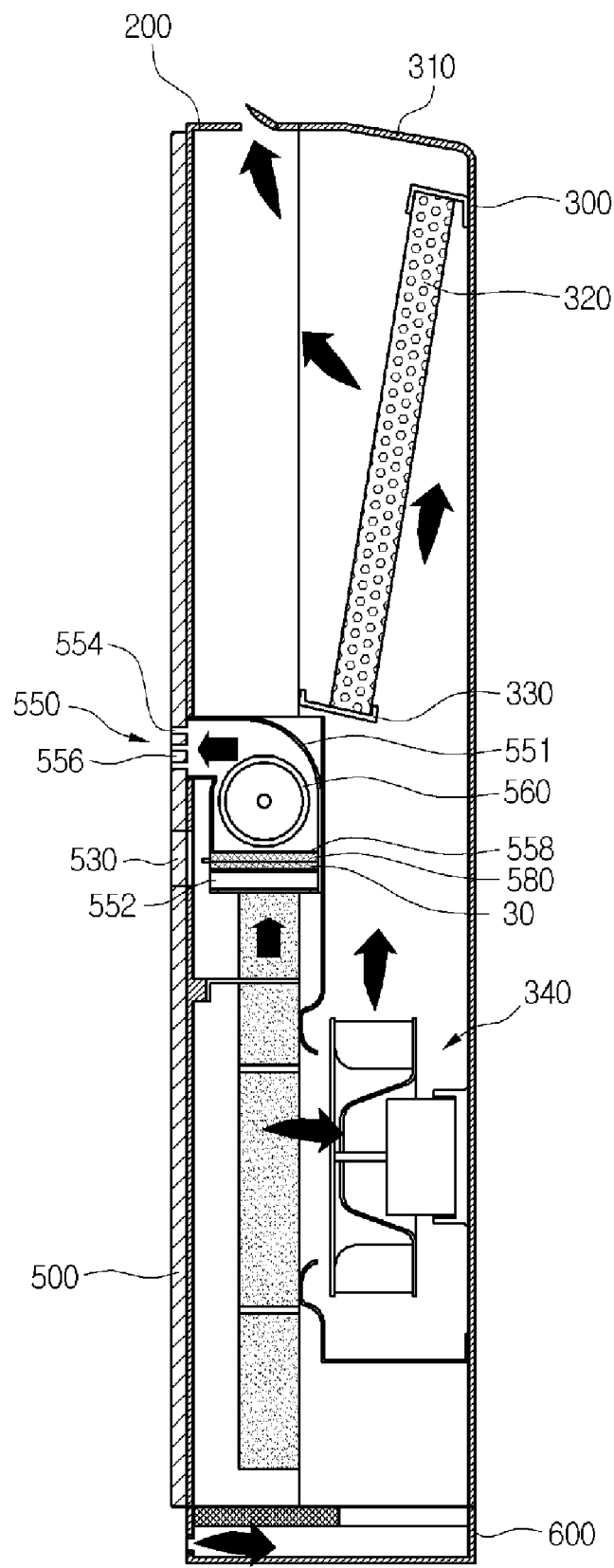
[Fig. 14]

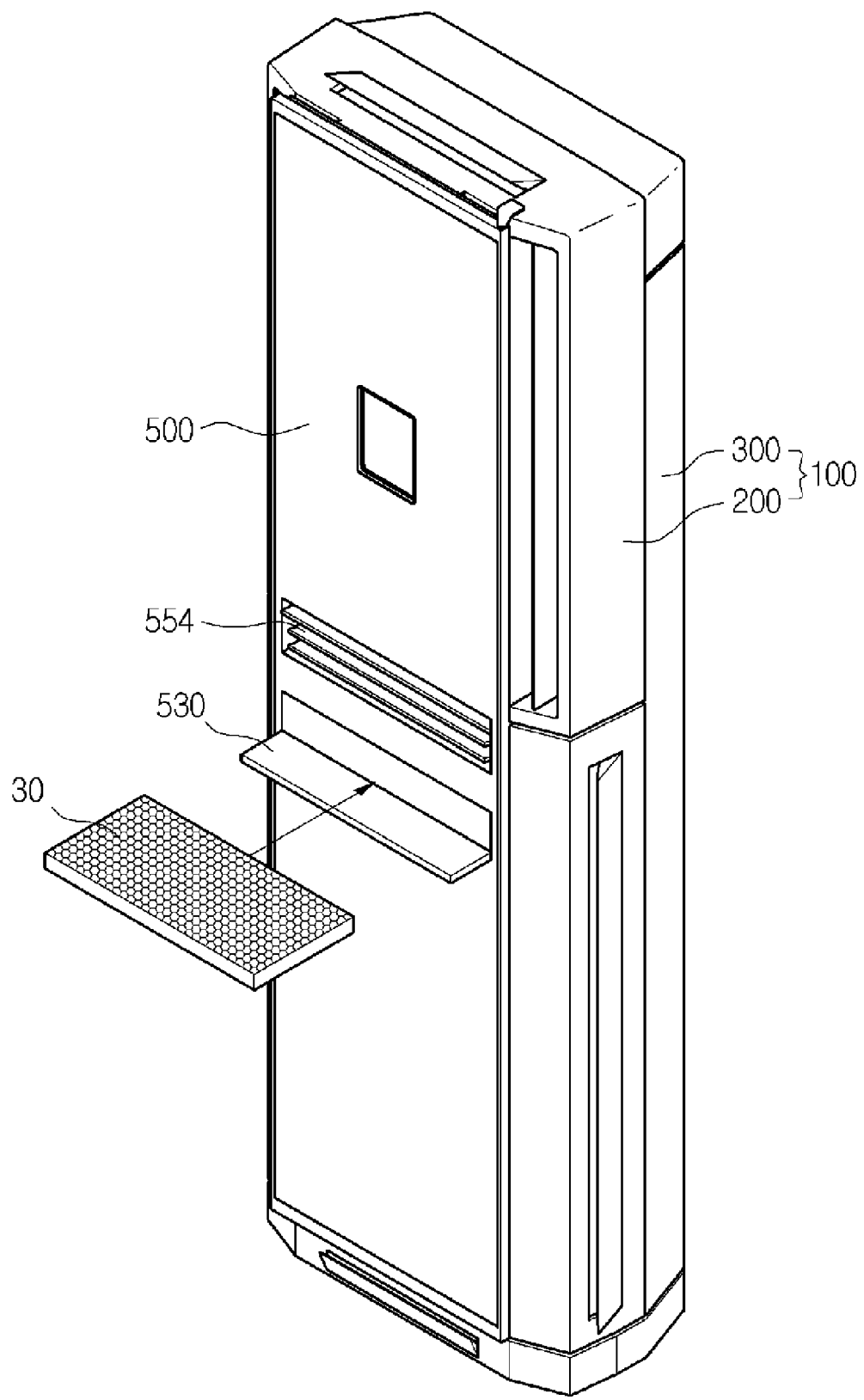
[Fig. 15]

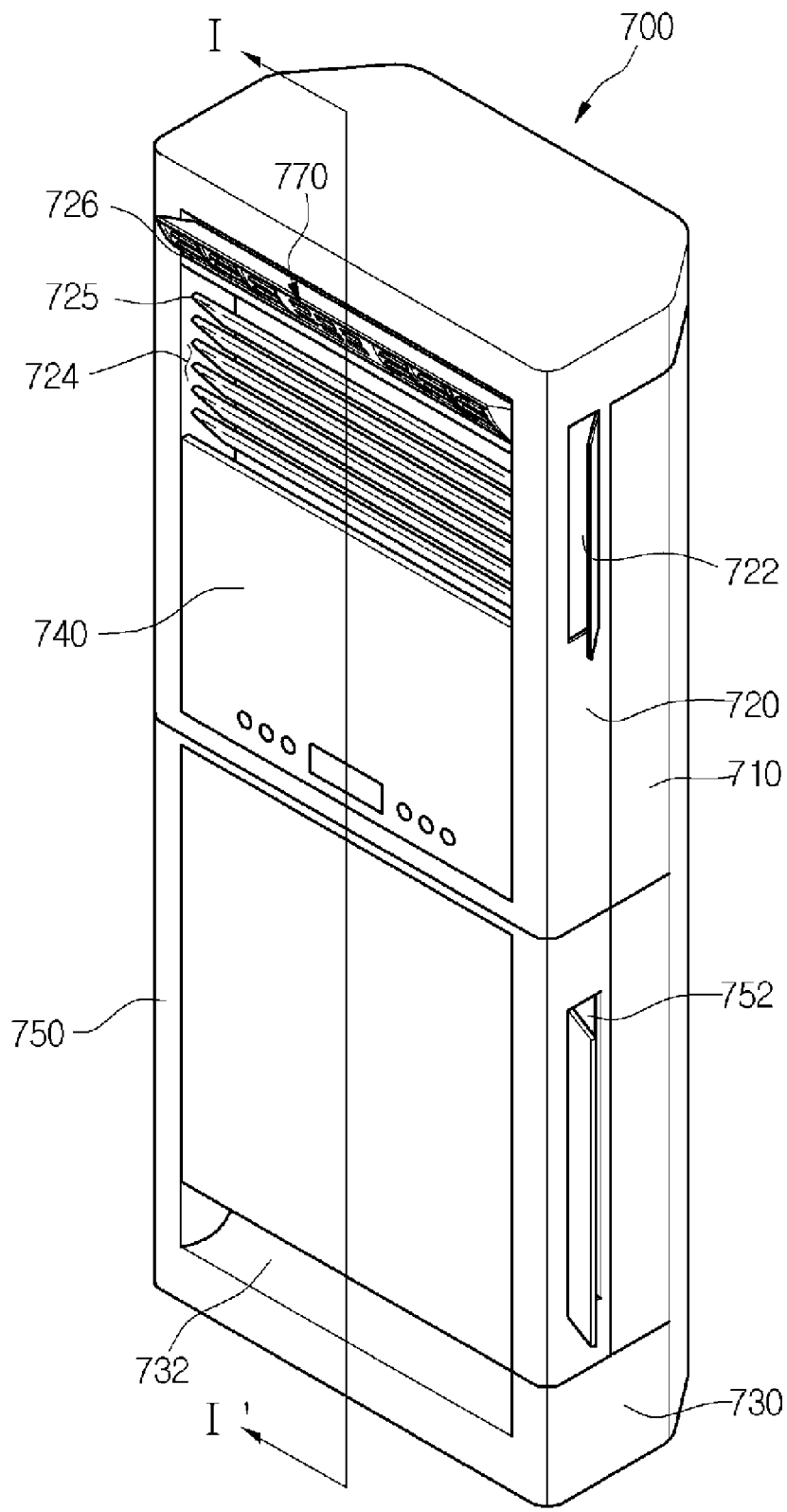
[Fig. 16]

[Fig. 17]
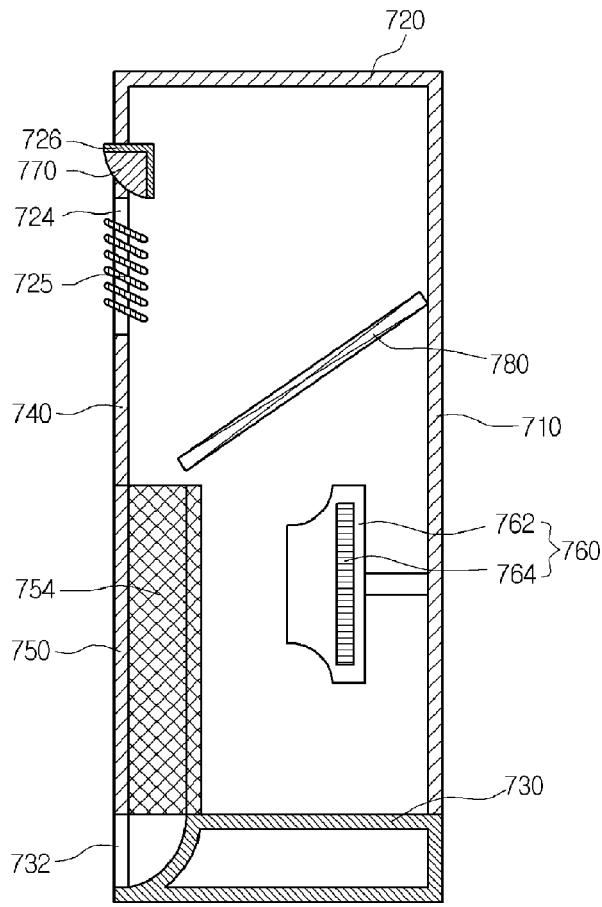
[Fig. 18]
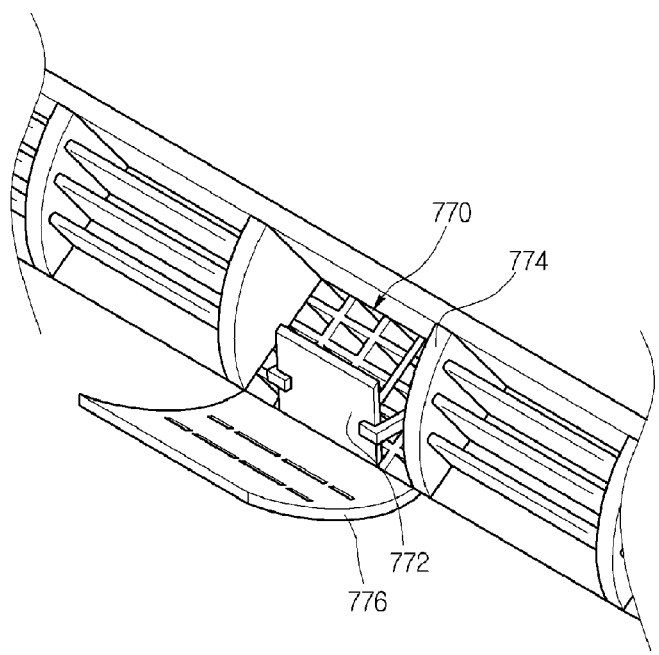

[Fig. 19]
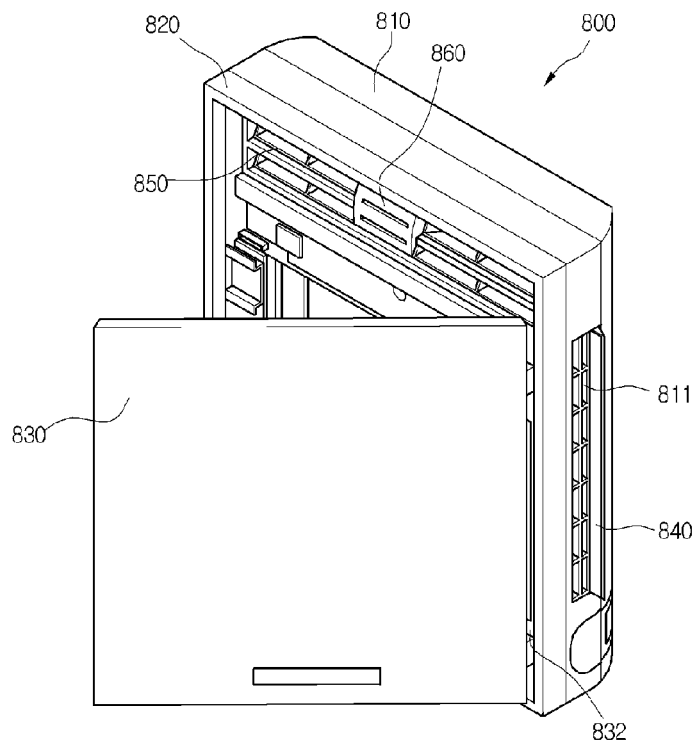
[Fig. 20]
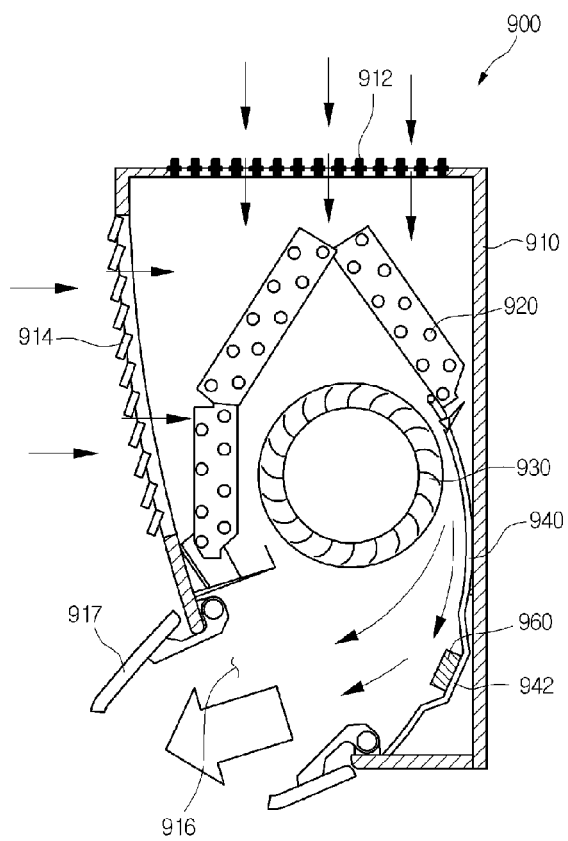

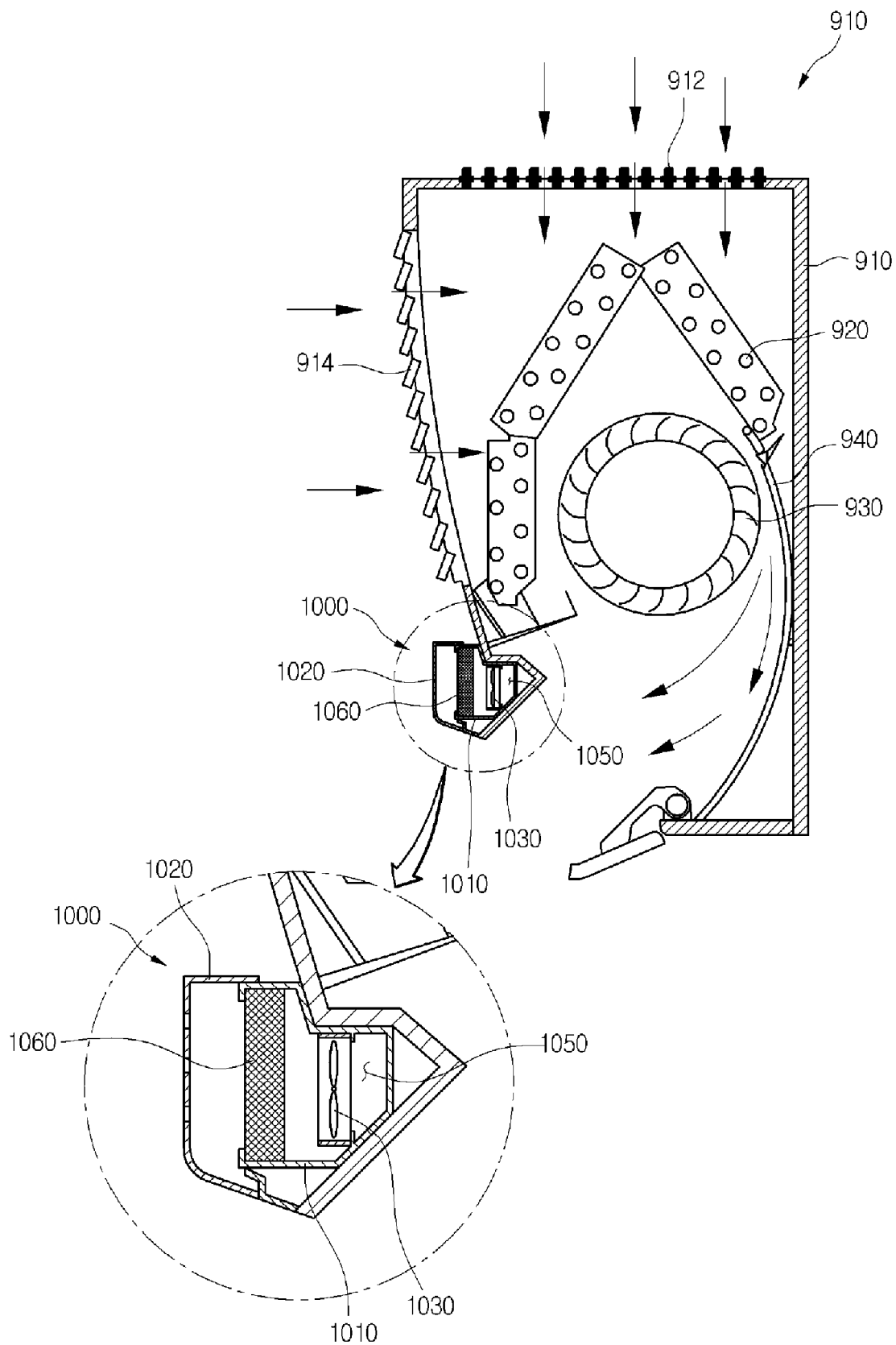
[Fig. 21]

AIR CONDITIONER

This application claims the benefit of PCT/KR/2006/004678, filed on Nov. 9, 2006 and claims priority to Korean Application Nos.: 10-2005-0112615, filed Nov. 23, 2005; 10-2006-0031008, filed Apr. 5, 2006; 10-2006-0031013, filed Apr. 5, 2006; and 10-2006-0031462, filed Apr. 6, 2006, all of which are hereby incorporated by reference herein in their entireties.

TECHNICAL FIELD

The present invention relates to an air conditioner, and more particularly, to an air conditioner that can kills diseases germs and viruses contained in air using a Kimchi lactic bacterium zymogenic material.

BACKGROUND ART

Generally, an air conditioner is a machine that can introduce indoor room air, cool and heat the introduced air through a heat-exchanging process, and discharge the cooled or heated air into the indoor side.

Recently, consumers have preferred an air conditioner having an air purifying function as well as the cooling and heating functions so that dust and bacteria contained in the air can be removed.

Therefore, an air conditioner having a dust collection filter for filtering off foreign objects contained in the air, a deodorizing filter for removing offensive odor by filtering fine particles contained in the air, and an antibacterial filter for absorbing and killing bacteria contained in the air has been widely used.

Although the variety of filters works well for normal bacteria but does not work for fatal viruses such as the pathogenic avian influenza virus and the server acute respiratory syndrome virus.

Recently, a Kimchi lactic bacterium zymogenic material that can prevent specific viruses such as the pathogenic avian influenza virus and the server acute respiratory syndrome virus from growing or kills the same has been searched and developed. It has been proved that the Kimchi lactic bacterium zymogenic material is very effective in suppressing the propagation of the fatal viruses. Particularly, it is well known that the bacteriocin secreted from Kimchi lactic bacteria kills the fatal viruses.

Therefore, there has been a need for killing the fatal viruses contained in the air using the Kimchi lactic bacterium zymogenic material. Since the disease germs and viruses are generally transferred along with the air, there is a need for a machine that can kill the disease germs and viruses contained in the indoor air.

DISCLOSURE OF INVENTION

Technical Problem

Accordingly, the present invention is directed to an air conditioner that can fulfill the above-described need.

An object of the present invention is to provide a germicidal air conditional that is improved in an antibacterial property and kills viruses contained in indoor air using a Kimchi lactic bacterium zymogenic material.

Another object of the present invention is to provide an air conditioner that can kill specific viruses such as the pathogenic avian influenza virus and sever acute respiratory syndrome.

A further another object of the present invention is to provide an air conditioner that can prevent the viruses contained in the air from propagating in a main body thereof.

A still further another object of the present invention to provide an air conditioner that can kill the viruses contained in the indoor air a Kimchi lactic bacterium zymogenic material even in the fall and spring where the cooling and heating functions of the air conditioner is not performed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, there is provided an air conditioner including: a main body formed by a plurality of members assembled with each other; and an air passage along which air introduced into the main body flows, wherein at least one of the member includes a Kimchi lactic bacterium zymogenic material formed on a portion of the member, which contacts the air flowing along the air passage.

In another aspect of the present invention, there is provided an air conditioner including: a main body formed by a plurality of members assembled with each other; an air passage along which air introduced into the main body flows; and a Kimchi bacteria filter provided on the air passage to kill viruses contained in the air flowing along the air passage, the Kimchi bacteria filter containing a Kimchi lactic bacterium zymogenic material.

In still another aspect of the present invention, there is provided an air conditioner including: a main body provided with an air intake hole and an air exhaust hole; a blower unit mounted in the main body to introduce or exhaust; a heat exchanger for allowing the air introduced by the blower unit to be heat-exchanged with refrigerant; and a Kimchi bacteria member installed inside or outside of the main body to discharge a Kimchi lactic bacterium zymogenic material.

Advantageous Effects

According to the present invention, since viruses contained in the air passing through the air conditioner are killed, the indoor air can be freshly maintained and thus any diseases caused by the viruses can be prevented.

Particularly, by the excellent anti-virus activation of the Kimchi lactic bacterium zymogenic material, the viruses such as pathogenic avian influenza virus or the SARS virus can be killed.

In addition, since the germs contained in the air are killed, the propagation of the germs in the main body can be prevented.

Furthermore, when the Kimchi lactic bacterium zymogenic material is provided in the form of a filter, the Kimchi lactic bacterium zymogenic material can be continuously supplied by replacing the filter.

In addition, when the Kimchi bacteria member is provided at an outside of the air conditioner, the Kimchi lactic bacterium zymogenic material can be continuously discharged to the air regardless of the season, thereby preventing the disease caused by the viruses or germs.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a perspective view of an air conditioner according to an embodiment of the present invention;

FIG. 2 is an exploded perspective view of the air conditioner of FIG. 1;

FIG. 3 is a rear perspective view of a front frame of the air conditioner of FIG. 1;

FIG. 4 is a front perspective view of a rear frame of the air conditioner of FIG. 1;

FIG. 5 is a perspective view of an air intake unit of the air conditioner of FIG. 1;

FIG. 6 is a rear perspective view of a front door of the air conditioner of FIG. 1;

FIG. 7 is an exploded perspective view of an air purifying unit according to an embodiment of the present invention;

FIG. 8 is an explode perspective view of a dust collection unit according to an embodiment of the present invention;

FIG. 9 is an exploded perspective view of a blower unit of the air conditioner of FIG. 1;

FIG. 10 is a perspective view of a modified example of the blower unit of FIG. 9;

FIG. 11 is a perspective view of a heat exchanger of the air conditioner of FIG. 1;

FIG. 12 is a perspective view of a base of the air conditioner of FIG. 1;

FIG. 13 is a perspective view of an air conditioner according to another embodiment of the present invention;

FIG. 14 is a vertical sectional view of the air conditioner of claim 13;

FIG. 15 is a view illustrating a state where a Kimchi bacteria filter is mounted on an air purifying unit of the air conditioner of FIG. 13;

FIG. 16 is a perspective view of an air conditioner according to still another embodiment of the present invention;

FIG. 17 is a sectional view taken along line I-I of FIG. 16;

FIG. 18 is an enlarged perspective view of a state where a Kimchi bacteria member according to the embodiment of the present invention is mounted on an upper air exhaust louver of the air conditioner;

FIG. 19 is a perspective view of a modified example of the air conditioner of FIG. 16;

FIG. 20 is a perspective view of a modified example of the air conditioner of FIG. 16; and FIG. 21 is a perspective view of a modified example of the air conditioner of FIG. 20.

BEST MODE FOR CARRYING OUT THE INVENTION

Reference will now be made in detail to the preferred embodiments of the present invention, examples of which are illustrated in the accompanying drawings. While the present invention has been particularly shown and described with reference to exemplary embodiments thereof, it will be understood by those of ordinary skill in the art that various changes in form and details may be made therein without departing from the spirit and scope of the present invention.

FIGS. 1 and 2 show an air conditioner according to an embodiment of the present invention.

According to a feature of the present invention, a Kimchi lactic bacterium zymogenic material that can kill the diseases germs and viruses is contained in portions of components, which contact the indoor air that is being introduced or discharged.

The Kimchi lactic bacterium zymogenic material may be selected from the group consisting of *Leucconostoc* genus Kimchi bacteria, *Lactobacillus* genus Kimchi bacteria, *Weissella* genus Kimchi bacteria, and a combination thereof.

The air conditioner is classified into a wall-mounted type, a floor-mounted type, a ceiling-mounted type, and a ceiling-buried type. In this embodiment, the floor-mounted air conditioner will be examined.

Referring to FIGS. 1 and 2, an air conditioner 10 of the present embodiment includes a main body defining an outer appearance of the air conditioner 10, a base 600 coupled to a bottom of the main body 100, and a front door 500 coupled to a front portion of the main body 100.

The main body 100 includes a front frame 200 defining a front-side appearance of the main body 100, a rear frame 300 defining a rear appearance of the main body 100, and a pair of air intake units 400 provided on a lower-both-sides of the front frame 200.

A heat exchanger allowing the air introduced to be heat-exchanged with a refrigerant therein, a drain unit 330 for collecting condensed water generated during the heat exchange process between the heat exchanger 320 and the air, a blower unit 340 for forcedly introducing the indoor air into the main body 100, and an air purifying unit 350 for purifying the air flowing toward the blower unit 340 in front of the blower unit 340 are disposed in the main body 100.

A rectangular front cover 210 is mounted on the front surface of the front frame 200. A seating groove 214 on which an electric component unit (not shown) provided on a manipulation unit formed on a front door 50 seats are formed on a central portion of the front cover 210.

Meanwhile, in the air conditioner 10 according to the present invention, a Kimchi lactic bacterium zymogenic material 20 is coated on portions of each component, which contact the air being introduced or formed together with the component through an injection molding process.

The functions of the components of the air conditioner 10 and the forming location of the Kimchi lactic bacterium zymogenic material will now be described in more detail.

FIG. 3 is a rear perspective view of the front frame of the air conditioner.

Referring to FIG. 3, the front frame 200 defines a front portion of the air conditioner 10 and functions to discharge the air to the indoor room.

The front frame 200 is box-shaped with a rear portion that is opened. Side exhaust holes 202 and 204 are vertically formed on left and right side surface of the front frame 200. A top air exhaust hole 206 is horizontally formed on a top surface of the front frame 200. Air exhaust vanes 203, 305, and 207 for selectively closing the respective exhaust holes 202, 204 and 206 are mounted on the respective air exhaust holes 202, 204 and 206.

The air exhaust vanes 203, 205, and 207 are pivotally mounted on the front frame 200 so adjust the exhausting direction of the air being discharged. The air exhaust vanes 203, 205 and 207 closes the air exhaust holes 202, 204 and 206 to prevent the indoor air from being introduced into the main body 100 through the air exhaust holes 202, 204 and 206.

Therefore, the air conditioned in the main body 100 is discharged sideward of the main body 100 through the air exhaust holes 202 and 204 and upward through the top air exhaust hole 206. As the air is discharged upward and sideward, the air can be three-dimensionally conditioned.

The Kimchi lactic bacterium zymogenic material 20 may be coated on an inner surface of the front frame 200 to kill the viruses contained in the air being introduced into the main body 100. Alternatively, the Kimchi lactic bacterium zymogenic material may be contained in the front frame 200 by being formed with the front frame 200 through the injection molding process.

In addition, the Kimchi lactic bacterium zymogenic material may be further coated on the surface of the air exhaust vanes 203, 205 and 207. Likewise, the Kimchi lactic bacterium zymogenic material may be injection molded together with the air exhaust vanes 203, 205 and 207 so that the Kimchi lactic bacterium zymogenic material can be contained in the air exhaust vanes 203, 205 and 207.

FIG. 4 is a front perspective view of the rear frame of the air conditioner.

Referring to FIG. 4, the rear frame 300 is mounted on the rear portion of the front frame 200 to define a rear portion of the main body 100. The rear frame 300 has a top and bottom surfaces that are opened. A top panel 310 may be coupled to the opened top surface of the rear frame 300.

Furthermore, the Kimchi lactic bacterium zymogenic material 20 may be further coated on the inner surface of the rear frame 300. Likewise, the Kimchi lactic bacterium zymogenic material may be injection-molded together with the rear frame 300.

The Kimchi lactic bacterium zymogenic material may be further coated on the inner surface of the top panel 310 or injected molded together with the top panel 310.

FIG. 5 is a perspective view of the air intake unit of the air conditioner.

Referring to FIG. 5, the air intake unit 400 is provided on lower both sides of the front frame 200. That is, the air intake unit 400 includes left and right air intake units. The air intake unit 400 is pivotally mounted with respect to the front frame 200 and the base 600.

That is, the air intake unit 400 includes a frame 410 having a side air intake hole 412, an air intake vane 420 coupled to a side of the frame 410 to selectively open and close the side air intake hole 412, and an air intake filter for purifying the air being introduced.

The frame 410 is formed in an L-shape when viewed from a top. The side air intake hole 412 is vertically formed on an outer surface of the frame 410 to introduce the air into the main body 100. An air intake grill 414 forming an airflow passage is formed on inside of the side air intake hole 412. The air intake vane 420 is pivotally mounted on the frame 410. The frame 410 is provided with an intake air filter receiving groove 415. The air intake filter 430 is slidably inserted in the receiving groove 415.

In addition, a guide portion 416 is formed on an inner portion of the frame 410. The guide portion 4126 is formed in a □-shape. The Kimchi lactic bacterium zymogenic material filter 30 (hereinafter Kimchi bacteria filter) containing the Kimchi lactic bacterium zymogenic material is contained is mounted on the guide portion 416. Therefore, the Kimchi bacterial filter 30 is mounted on the frame 410 through a sliding motion along the guide portion 416.

The Kimchi lactic bacterium zymogenic material 20 is coated on portions of the air intake unit 400, i.e., portions of the frame 410, air intake vane 420 and air intake grill 414, or injection-molded together with the air intake unit 400 so that the Kimchi lactic bacterium zymogenic material can be contained the air intake filter 430.

In this embodiment, although the Kimchi bacteria filter 30 is mounted in the air intake unit 400, the present invention is not limited to this embodiment. For example, the Kimchi bacteria filter 30 may be supported near the air intake unit 400 by a separate member.

Meanwhile, the Kimchi bacteria filter 30 includes a rectangular frame 31. A filter mesh 32 containing the Kimchi lactic bacterium zymogenic material is mounted on the frame 31. The filter mesh 32 may be formed of a flat fabric body formed in a honeycomb-shape, a luffa-shape, a net-shape, or a cotton-shape.

The Kimchi bacteria filter 30 may be formed by depositing or coating the Kimchi lactic bacterium zymogenic material on a filter such as a non-woven fabric or a filtering paper. Alternatively, the Kimchi bacteria filter 30 may be formed by filling the lactic bacterium zymogenic material into a space defined between two layers of the filter. Alternatively, the Kimchi bacteria filter 30 may be injection molded together with a main filter body. A process for forming the Kimchi bacteria filter 30 will be described later.

FIG. 6 is a perspective view of the front door of the air conditioner.

Referring to FIG. 6, the front door 500 of the present embodiment is mounted on the front portion of the front frame 200.

The front door 500 includes a doorframe 510 and a front panel 520 mounted on the doorframe 510.

The Kimchi lactic bacterium zymogenic material is coated on an inner surface of the front door 500, i.e., on inner surfaces of the door frame 510 and the front panel 520. Alternatively, the front door 500 may be injection molded by an injection molding material containing the Kimchi lactic bacterium zymogenic material.

FIG. 7 is an exploded perspective view of the air purifying unit

Referring to FIG. 7, the air purifying unit 350 is installed in front of the blower unit 340. The air purifying unit 350 includes a casing 351 defining an outer appearance and a plurality of filters for purifying the introduced air. The plurality of filters may be at least one selected from a dust collection filter 352, a deodorizing filter 354, an antibacterial filter 356, and a plasma filter 358, and a Kimchi bacteria filter 30.

Describing in more detail, the casing 351 is formed in a box-shape defining a space in which the filters are received. The casing 351 has front, rear and top surfaces that are opened. The casing 351 may be coasted with the Kimchi lactic bacterium zymogenic material or injection molded by a material containing the Kimchi lactic bacterium zymogenic material. The casing 351 is provided with filter receiving portions 252a through 260a for receiving the respective dust collection filter 352, deodorizing filter 354, an antibacterial filter 356, plasma filter 358, and Kimchi bacteria filter 30.

A mounting hook 351a is formed on a rear portion of the casing. By the mounting hook 351a, the casing 351 is coupled to the blower unit 340. At this point, the blower unit 340 is provided with a coupling hole to which the mounting hook 351a will be coupled. However, the present invention is not limited to this coupling method of the air purifying unit 350.

The dust collection filter 352 is formed in a mesh type for filtering off foreign objects each having a relatively large size, which are contained in the air.

The deodorizing filter 354 is configured to filter off fine particles that generate offensive smell in the air.

The antibacterial filter 356 is deposited with a germ-killing material for absorbing or killing the conventional viruses.

The plasma filter 358 discharges plasma for removing the fine dusts and particles by ionizing the fine dust and particles contained in the air and absorbing the ionized particles.

At this point, the Kimchi lactic bacterium zymogenic material may be deposited or coated on at least one of the respective dust collection filter 352, deodorizing filter 354, an antibacterial filter 356, and plasma filter 358.

In order to purify the air being introduced into the main body, the air purifying unit 350 is provided on the front end of the blower unit 340. However, a dust collection unit 360 may be provided on the front end of the blower unit to purify the air introduced into the main body 100.

The dust collection unit 360 will now be described.

FIG. 8 is an exploded perspective view of the dust collection unit according to an embodiment of the present invention.

Referring to FIG. 8, the dust collection unit 360 is mounted on the blower unit 340, i.e., a fan housing 346, as described above.

The dust collection unit 360 includes a dust collection frame 370 for collecting the dusts, a Kimchi bacteria filter 30 for killing viruses contained in the air passing through the dust collection frame 370, and a holder 380 for holding the dust collection frame 370 and the Kimchi bacteria filter.

The dust collection frame 370 includes a plurality of discharge lines 372 that are arranged horizontally to perform the discharge dust collection by receiving power from an external source, a contact portion 374 to which the discharge lines 372 are electrically connected, and reinforcing ribs 376 disposed in a direction crossing the discharge lines 372.

The holder 380 includes a seating portion 382 on which the dust collection frame 370 and the Kimchi bacteria filter 30 are mounted, an electrode 386 formed on a location of the inner portion of the seating portion 382, which corresponds to the contact portion 354, and a lead line 388 for applying power from an external source to the electrode 386.

Meanwhile, the dust collection frame 370 is mounted on the seating portion 382 after the Kimchi bacteria filter 30 is first mounted on the seating portion 382. That is, the Kimchi bacteria filter 30 is disposed in rear of the dust collection frame 370. The air introduced into the main body 100 passes through the dust collection frame 370 and then passes through the Kimchi bacteria filter 30 in the coursed of which the viruses contained in the air are killed.

Since the Kimchi bacteria filter 30 is mounted and supported on the holder 380, there is no need to provide a separate coupling member for fixing or coupling the Kimchi bacteria filter 30.

In this embodiment, although the Kimchi bacteria filter 30 is mounted on the seating portion 382, the present invention is not limited to this. That is, the Kimchi bacteria filter 30 may be mounted on the front surface of the dust collection frame 370 or the rear surface of the holder 380. In this case, a guide for mounting and fixing the Kimchi bacteria filter 30 may be further formed on the holder 380.

FIG. 9 shows an exploded perspective view of the blower unit.

Referring to FIG. 9, the blower unit 340 is mounted on a lower portion of the drain unit 330.

The blower unit 340 includes a blower fan 342 for forcedly generating airflow of the air in the main body 100, a rotational motor 344 for transmitting rotational power to the blower fan 342, and a fan housing 346 enclosing and protecting the blower fan 342 and guiding the airflow generated by the rotation motion of the blower fan 342.

The blower fan 342, the rotational motor 344, the fan housing 346 are fully coated with the Kimchi lactic bacterium zymogenic material 10 or injection molded using a material containing the Kimchi lactic bacterium zymogenic material.

The fan housing 346 is provided with a hook coupling hole 346a in which the mounting hook 351a formed on the casing 351 of the air purifying unit 350 is coupled.

FIG. 10 is a perspective view of a modified example of the blower unit.

Referring to FIG. 10, a Kimchi bacteria filter 30 is mounted on the blower unit 340.

That is, a pair of □-shaped guides are vertically formed on a front surface of the fan housing 346 to guide the mounting of the Kimchi bacteria filter 30 and fix the Kimchi bacteria filter 30. The Kimchi bacteria filter 30 mounted on the frame 410 by the sliding motion along the guides 347.

FIG. 11 is a perspective view of the heat exchanger.

Referring to FIG. 11, the heat exchanger 320 of the present embodiment is vertically arranged at an upper inner side of the rear frame 300.

The heat exchanger 320 includes a refrigerant tube 322 bent at a plurality of locations to allow the refrigerant to flow and a plurality of heat radiation fins 324 disposed at outer sides of the refrigerant tube 322 to increase the contact area between the refrigerant flowing along the refrigerant tube 322 and the air flowing in the main body 100.

The Kimchi lactic bacterium zymogenic material 20 may be coated on the surfaces of the refrigerant tube 322 and the heat radiation fins 324. Alternatively, the refrigerant tube 322 and the heat radiation fins 324 may be injection-molded using a material mixed with the Kimchi lactic bacterium zymogenic material.

A drain unit (330 of FIG. 2) is mounted under the heat exchanger 320 to collect water condensed by the heat exchanger 320.

The drain unit 330 is also coated with the Kimchi lactic bacterium zymogenic material 10 or is injection-molded together with the Kimchi lactic bacterium zymogenic material.

FIG. 12 is a perspective view of the base of the air conditioner.

Referring to FIG. 12, the base 600 is mounted under the rear frame 300 to support the main body 100. That is, the rear frame 300 is coupled to a top-rear surface of the base 600 and the air intake unit 400 is coupled to a top-front surface of the base 600.

The base 600 is provided with an air intake hole 602 through which the air is introduced from the front side of the main body 100. A plurality of filters 610 for purifying the air introduced through the front intake hole 602 are provide above an upper portion of the base 600. Each of the filters 610 is mounted on the casing 612 through a sliding motion. The air intake vane 604 is pivotally mounted in the front air intake hole 602 to selectively open and close the front air intake hole 602.

The Kimchi lactic bacterium zymogenic material 20 may be coated on surfaces, particularly on inner surfaces of the air intake vane 604 and the base 600. Alternatively, the base 600 and the air intake vane 604 may be injection-molded using a material mixed with the Kimchi lactic bacterium zymogenic material.

Likewise, the Kimchi lactic bacterium zymogenic material 20 is coated on the surface of the casing 612. Alternatively, the casing 612 may be injection-molded using a material containing the Kimchi lactic bacterium zymogenic material. At least one of the filters inserted in the casing 612 is deposited or coated with the Kimchi lactic bacterium zymogenic material 20. Alternatively, a Kimchi bacteria filter 30 may be additionally inserted in the casing 612.

The following will describe a process for coating the Kimchi lactic bacterium zymogenic material 20 and a process for injecting molding a member containing the Kimchi lactic bacterium zymogenic material 20.

A. Coating Method 1 of Kimchi Lactic Bacterium Zymogenic Material

The Kimchi lactic bacterium zymogenic material coating process is performed by coating a mixture solution of the Kimchi lactic bacterium zymogenic material and binder on a member.

Describing in more detail, the Kimchi lactic bacterium zymogenic material may be selected from the group consisting of Kimchi lactic bacterium zymogenic material culture solution, Kimchi lactic bacterium zymogenic material concentration, and a mixture thereof. The Kimchi lactic bacterium zymogenic material may be selected from the group consisting of *Leucconostoc* genus Kimchi bacteria, *Lactobacillus* genus Kimchi bacteria, *Weissella* genus Kimchi bacteria, and a combination thereof.

The binder may be selected from silicon modified resin, urethane resin, acryl resin, and silicon resin.

The member may be a member that may contact and propagate germs or viruses or a filter.

The coating may be performed by spraying a mixture solution of the Kimchi lactic bacterium zymogenic material and the binder or by dipping the member in the mixture solution.

Describing in more detail, the Kimchi lactic bacterium zymogenic material is generated during a ripening process of Kimchi. Therefore, the Kimchi lactic bacterium zymogenic material may be directly extracted from Kimchi or obtained by buying the Kimchi lactic bacterium in the market and cultivating the Kimchi lactic bacterium. That is, any Kimchi lactic bacterium zymogenic material may be used without any limitation. In addition, the Kimchi lactic bacterium zymogenic material may be selected from the group consisting of *Leucconostoc* genus Kimchi bacteria, *Lactobacillus* genus Kimchi bacteria, *Weissella* genus Kimchi bacteria, and a combination thereof. Particularly, *Leucconostoc* genus Kimchi bacteria are preferable. Among the *Leucconostoc* genus Kimchi bacteria, the Kimchi lactic bacterium zymogenic material may be selected from the group consisting of *Leuconostoc citreum, Leuconostoc* kimchiii, *Leuconostoc mesenteroides*, and a mixture thereof. The *Leuconostoc citreum* is most preferable as it has excellent anti-germ property.

As the binder, silicon modified resin, urethane resin, acryl resin, or silicon resin may be used as the binder. However, the present invention is not limited thereto. When the binder is added, the Kimchi lactic bacterium zymogenic material can be more securely adhered to the surface of the member. Furthermore, the binder increases the bonding force between the member and the Kimchi lactic bacterium zymogenic material, thereby reducing the eruption rate of the Kimchi lactic bacterium zymogenic material and thus maintaining the antibacterial performance well.

The member may be an object that may contact and propagate germs or viruses or a filter. For example, the member may be an object formed of thermoplastic resin, thermosetting resin, rubber, or metal. The object may be variously used according to its material.

The member may be an air purifying filter. At this point, the material, size and shape of the air purifying filter are not specifically limited as far as it can function as the purifying filter. For example, the air purifying filter may be formed of a material such as glass fiber, ion exchange fiber, cellulose fiber, asbestos fiber, organic fiber, or inorganic fiber. In addition, the air purifying filter may be formed of metal such as zinc, copper, or aluminum, or plastic. The air purifying filter may be variously applied according to its material. The shape of the air purifying filter is not specifically limited. For example, the shape may be a honeycomb-type, a cross-type, a filter-paper-type, a cotton-type, a mesh-type, a plate-type, or a foam-type.

The air purifying filter may be an active-carbon filter, a high efficiency particulate air filter (HEPA) filter, or a filter used for air-cleaning in a vehicle. In addition, the member may be a water purifying filter.

The shape of the air purifying filter is not specifically limited.

The coating may be performed by spraying a mixture solution of the Kimchi lactic bacterium zymogenic material and the binder or by dipping the member in the mixture solution.

The method of the mixture is not specifically limited as far as the Kimchi lactic bacterium zymogenic material is mixed with the binder such that it can be coated on the surface of the member. The Kimchi lactic bacterium zymogenic material is within a range of 0.001-20 w %, more preferably, 2-20 w % with respect to 100 w % of the member on which the Kimchi lactic bacterium zymogenic material will be coated. However, the present invention is not limited to this case. That is, if required, the w % of the Kimchi lactic bacterium zymogenic material with respect to the member can be properly adjusted. The ratio of the binder to Kimchi lactic bacterium zymogenic material is not specifically limited. If required, the ratio can be properly adjusted.

Meanwhile, before the Kimchi lactic bacterium zymogenic material is coated on the member, the member may go through a cleaning process and/or a heat treatment process for drying the member. The time and temperature of the heat treatment process can be projection adjusted according to the shape, type, size and the like. When the member is formed of metal, it is preferable that oil components that are attached on the surface of the member during the manufacturing process or storage are removed through the cleaning process.

B. Coating Method 2 of Kimchi Lactic Bacterium Zymogenic Material

This coating method of Kimchi lactic bacterium zymogenic material is preformed by simultaneously or sequentially coating the Kimchi lactic bacterium zymogenic material, inorganic antibacterial agent, and binder on the surface of the member. The inorganic antibacterial agent may include nano-metal particles.

The nano-metal particles may particles having germicidal power, such as Ag, Zn, Pt, Fe, Cd, Pd, Rh or a combination thereof.

The coating may be preformed by spraying the mixture solution of the Kimchi lactic bacterium zymogenic material, inorganic particles, and antibacterial agent on the member. Alternatively, the coating may be preformed by coating the inorganic particles on the member and then fixing the Kimchi lactic bacterium zymogenic material on the member on which the inorganic particles are coated.

Describing in more detail, the nano-metal particles mean the nano-meter-sized metal particles. Any metal that is nano-sized can be used. The nano-metal particles suppress the propagation of the microorganism by suppressing the reproduction function of the bacteria, mold and the like and kill the microorganism by permeating into the cells to stop the enzyme function required for breathing of the microorganism and thus prevent the metabolism. Particularly, the Ag, Zn, Cu particles are preferable in view of the antibacterial function and safety for environment and human body.

The coating may be preformed by preparing a mixture solution of the Kimchi lactic bacterium zymogenic material, inorganic antibacterial agent, and binder, and spraying the mixture solution on the member. Alternatively, the coating may be preformed by dipping the member in the mixture solution. The process for preparing the mixture solution is not specifically limited as far as the Kimchi lactic bacterium zymogenic material, inorganic antibacterial agent, and binder can be properly coated. The Kimchi lactic bacterium zymogenic material in the mixture solution is preferably 0.001-20 w %, more preferably 5-20 w %, with respect to the 100 w % of the member. However, the present invention is not limited to this. If required, the amount of the Kimchi lactic bacterium zymogenic material can be properly adjusted. The content ratio between the Kimchi lactic bacterium zymogenic material, inorganic antibacterial agent, and binder is not specifically limited but properly adjusted if required.

Alternatively, the coating process may be performed by first coating the inorganic antibacterial agent on the surface of the member and then coating the Kimchi lactic bacterium zymogenic material on the member on which the Ag. The process for coating the inorganic antibacterial agent on the surface of the member may be preformed according to a well-known method in the art. If required, the method may be properly changed to a state where the inorganic antibacterial agent can be properly coated. The process for coating the Kimchi lactic bacterium zymogenic material on the member on which the inorganic antibacterial agent is coated may be preformed according to a well-known method in the art. That is, a chemical or physical method can be properly used according to the used of the member. Likewise, any one of the spraying, dipping, other methods that can uniformly coat the mixture on the member can be used.

Meanwhile, before the Kimchi lactic bacterium zymogenic material is coated on the member, the member may go through a cleaning process and/or a heat treatment process for drying the member. The time and temperature of the heat treatment process can be projection adjusted according to the shape, type, size and the like. When the member is formed of metal, it is preferable that oil components that are attached on the surface of the member during the manufacturing process or storage are removed through the cleaning process.

C. Molding Method of Kimchi Lactic Bacterium Zymogenic Material

The molding of Kimchi lactic bacterium zymogenic material is performed by molding a mixture of the Kimchi lactic bacterium zymogenic material and a main material. Alternatively, an outer layer is formed of the mixture and an inner layer is formed of the main material or a mixture having a less amount of the Kimchi lactic bacterium zymogenic material.

Describing in more detail, the main material may be selected from the group consisting of silicone, polyurethane, polyethylene, polypropylene (PP), polyvinylchloride (PVC), latex, acrylonitrile butadiene styrene (ABS), polytetrafluoroethylene (PTFE), polycarbonate (PC), polyvinylalcohol (PVA), and a combination thereof.

The mixture ratio between the Kimchi lactic bacterium zymogenic material and the main material is not specifically limited. If required, the mixture ratio can be properly adjusted. The mixing method of the Kimchi lactic bacterium zymogenic material and the main material is not specifically limited as far as the mixture can form the desired member. The Kimchi lactic bacterium zymogenic material in the mixture is preferably 0.001-20 w %, more preferably 5-20 w %, with respect to the 100 w % of the member. However, the present invention is not limited to this. If required, the amount of the Kimchi lactic bacterium zymogenic material can be properly adjusted. When nano-metal particles are added, it is preferable that they are within a range of 100-2000 ppm. However, the present invention is not limited to this. If required, it can be properly adjusted.

The molding process is preformed by mixing the Kimchi lactic bacterium zymogenic material and the main material, preparing a mold for molding the member, and performing the extruding or injecting process by injecting the mixture in the mold. The mixing method of the Kimchi lactic bacterium zymogenic material and the main material is not specifically limited as far as the mixture can form the desired member. However, the molding temperature is not specifically limited, but there is a need to properly adjust the molding temperature considering the property of the main material. Considering the property change of the Kimchi lactic bacterium zymogenic material, it is preferable that the molding temperature is within a range of 100-180° C.

Alternatively, an outer layer is formed of the mixture and an inner layer is formed of the main material or a mixture having a less amount of the Kimchi lactic bacterium zymogenic material. For example, a Kimchi bacterium molded member is first formed using a mixture of the Kimchi lactic bacterium zymogenic material and the main material and an additional molded member is formed using the main material or a mixture having a less amount of the Kimchi lactic bacterium zymogenic material. Then, the Kimchi bacterium molded member and the additional molded member are assembled with each other. Generally, since the bacteria or viruses are more likely to propagate on an outer portion of the member, which contacts a medium, than an inner portion of the member, the antibacterial effect can be further improved by concentrating the Kimchi lactic bacterium zymogenic material on the outer portion when using an equal amount of the antibacterial agent.

D. Method of Forming the Kimchi Lactic Bacterium Zymogenic Material Using Encapsulating Method This method is realized by forming the Kimchi lactic bacterium zymogenic material using a mixture of the Kimchi lactic bacterium zymogenic material capsules and the main material. Alternatively, an outer layer is formed of the mixture of the Kimchi lactic bacterium zymogenic material capsules and the main material and an inner layer is formed of the main material or a mixture having a less amount of the Kimchi lactic bacterium zymogenic material capsules.

Describing in more detail, the Kimchi lactic bacterium zymogenic material capsules may be formed of a material selected from the group consisting of melamine, polyurethane, gelatine, acryl, epoxy, starch, alginate, chitosan, a combination thereof.

The Kimchi lactic bacterium zymogenic material capsule includes a core material and a wall material. The core material may have a target material such as an antibacterial material, a deodorizing material, or an aromatic material. The wall material may have micro or nano-sized particles by forming a thin layer using a synthetic or natural polymer material. The wall material is not specifically limited as far as it can enclose the Kimchi lactic bacterium zymogenic material. The wall material may be formed of a material selected from the group consisting of melamine, polyurethane, gelatine, acryl, epoxy, starch, alginate, chitosan, and a combination thereof. By encapsulating the Kimchi lactic bacterium zymogenic material, the Kimchi lactic bacterium zymogenic material is not property-changed at the molding temperature of the member and thus the antibacterial property can be further enhanced.

The molding process is preformed by mixing the Kimchi lactic bacterium zymogenic material capsules and the main material, preparing a mold for molding the member, and performing the extruding or injecting process by injecting the mixture in the mold. The mixing method of the Kimchi lactic bacterium zymogenic material capsules and the main material is not specifically limited as far as the mixture can form the desired member. However, the molding temperature is not specifically limited, but there is a need to properly adjust the molding temperature considering the property of the main material. Considering the property change of the Kimchi lactic bacterium zymogenic material, the molding may be preformed at a higher temperature, i.e., 100-250° C. as compared with the case where the Kimchi lactic bacterium zymogenic material is not encapsulated.

Alternatively, an outer layer is formed of the mixture and an inner layer is formed of the main material or a mixture having a less amount of the Kimchi lactic bacterium zymogenic material capsules. Generally, since the bacteria or viruses are more likely to propagate on an outer portion of the member, which contacts a medium, than an inner portion of the member, the antibacterial effect can be further improved by concentrating the Kimchi lactic bacterium zymogenic material on the outer portion when using an equal amount of the antibacterial agent.

The following will describe examples. However, the present invention is not limited to the following examples.

Example 1

An aluminum mesh manufactured by Airfill Company was dipped in 2.5% NaOH for 3 minutes to remove oil components from the mesh. Then, the aluminum mesh was cleaned using 2.5% NaOH. These processes are repeated by 7 times. Then, the aluminum mesh was heat-treated in a dry oven at a temperature of 40° C. for 2 hours. Then, a mixture solution of the Kimchi lactic bacterium zymogenic material and silicon modified acryl binder was prepared. Then, the mixture solution was coated on the aluminum mesh through a spraying process. As a result, an aluminum mesh coated with the Kimchi lactic bacterium zymogenic material was obtained.

Example 2

In order to measure the antibacterial property of the air purifying filter using the aluminum mesh obtained in Example 1 against bacteria such as *Escherichia coli* ATCC 25922, *Staphylococcus aureus* ATCC 6538, and *pseudomonas aeruginosa* ATCC 27853, germicidal power of the air purifying filter was tested according to a KS M 0146-2003 method.

That is, germicidal power of the air purifying filter against the bacteria of *Escherichia coli* ATCC 25922, *Staphylococcus aureus* ATCC 6538, and *pseudomonas aeruginosa* ATCC 27853 was tested using test devices such as a high pressure germicidal device, a virus culturing thermostat, sterilized container, colony counter, thermostat water tank, and a light absorption photometer. The three types of bacteria were deposited on the respective aluminum mesh filter (1.0 cm×1.0 cm) obtained in Example 1. Three comparative examples (deposited with the respective three types of the bacteria) and three mesh filters were disposed in an erlenmeyer flask and cultivated at 35±1° C. for 3 hours at 120 rpm. Then, the bacteria are separated and diluted by a physiological saline solution and cultivated on a flat plate at 37° C. for 48 hours. Then, the number of bacterial was counted. The results are shown in the following tables 1 through 3.

TABLE 1

Germicidal power against *Escherichia coli* ATCC 25922

| | Cultivation Hour | | | |
|---|---|---|---|---|
| | 0 | After 1 hour | After 2 hours | After 3 hours |
| Comparative Examples | $1.5 \times 0^5$ CFU/□ | $1.6 \times 0^5$ CFU/□ | $1.7 \times 0^5$ CFU/□ | $2.0 \times 0^5$ CFU/□ |
| Aluminum mesh filter | $1.5 \times 0^5$ CFU/□ | <10 CFU/□ 99.9 | <10 CFU/□ 99.9 | <10 CFU/□ 99.9 |

TABLE 2

Germicidal power against *Staphylococcus aureus* ATCC 6538

| | Cultivation Hour | | | |
|---|---|---|---|---|
| | 0 | After 1 hour | After 2 hours | After 3 hours |
| Comparative examples | $1.3 \times 0^5$ CFU/□ | $1.5 \times 0^5$ CFU/□ | $1.8 \times 0^5$ CFU/□ | $2.2 \times 0^5$ CFU/□ |
| Aluminum mesh filter | $1.3 \times 0^5$ CFU/□ | <10 CFU/□ 99.9 | <10 CFU/□ 99.9 | <10 CFU/□ 99.9 |

TABLE 3

Germicidal power against *pseudomonas aeruginosa* ATCC 27853

| | Cultivation Hour | | | |
|---|---|---|---|---|
| | 0 | After 1 hour | After 2 hours | After 3 hours |
| Comparative examples | $1.2 \times 0^5$ CFU/□ | $1.4 \times 0^5$ CFU/□ | $1.7 \times 0^5$ CFU/□ | $2.2 \times 0^5$ CFU/□ |
| Aluminum mesh filter | $1.2 \times 0^5$ CFU/□ | <10 CFU/□ 99.9 | <10 CFU/□ 99.9 | <10 CFU/□ 99.9 |

As shown in Tables 1 through 3, it can be noted that the germicidal power of the air purifying filter containing the Kimchi lactic bacterium zymogenic material against the bacteria of *Escherichia coli* ATCC 25922, *Staphylococcus aureus* ATCC 6538, and *pseudomonas aeruginosa* ATCC 27853 is remarkably improved.

The following will describe the above-described air conditioner 10.

When the user pushes the manipulation button 522 provided on the front door 500, electric power is applied to the germicidal air conditioner 10. Then, the rotational motor 344 disposed in the main body 100 rotates and the rotation force of the rotational motor 344 rotates the blower fan 342. Then, by the rotational force of the blower fan 342, air is introduced through the side air intake hole 412 formed on the air intake unit 400 and the front air intake hole 602 formed on the base 600.

Then, the virus and germs contained in the air introduced through the side and front air intake holes 412 and 602 are killed by the Kimchi lactic bacterium zymogenic material 20 contained in or coated on the air intake unit 400 and base 600.

In addition, the air introduced in the main body 100 flows toward the blower fan 342 by the operation of the blower fan 342 and is purified while passing through the air purifying unit 350a. In addition, the viruses contained the Kimchi lactic bacterium zymogenic material 20 is killed while passing through the air purifying unit 350a.

In addition, the virus contained in the air is further killed by the Kimchi lactic bacterium zymogenic material 20 of the flower unit 340. Thus, the propagation of the virus on the blower fan 342 and the fan housing 346 can be prevented and thus the blowing of the air containing the viruses from the blower unit 340 can be prevented.

Furthermore, the propagation of the viruses contained in the air introduced into the main body 100 can be prevented by the Kimchi lactic bacterium zymogenic material coated on the inner surfaces of the front frame 200, rear frame 300 and top frame 310 and injection-molded together with the same.

In addition, the air passing through the blower fan 342 is directed toward the heat exchanger 320. The air directed to the heat exchanger 320 is heat-exchanged with the refrigerant of the heat exchanger 320 to be cooled or heated. Then, by the continuous blowing operation of the blower fan 342 is discharge out of the main body through the side air exhaust holes 202 and 204 and the top air exhaust hole 206.

At this point, since the Kimchi lactic bacterium zymogenic material is coated on or contained in the discharge fins 324 and the cooling tube 322 of the heat exchanger 320, the propagation of the virus on the discharge fins 324 and the cooling tube 322 is prevented. Particularly, since the drain unit, in which the viruses can be more easily propagated, is coated with or injection-molded with the Kimchi lactic bacterium zymogenic material, the propagation of the viruses can be prevented.

Furthermore, since the Kimchi lactic bacterium zymogenic material is coated on or contained in the air exhaust vanes 203 and 205 provided in the air exhaust holes 202, 204 and 206, the propagation of the virus on the same is prevented.

As described above, since the propagation of the virus on the discharge fins 324 and the cooling tube 322 is coated on or contained in each member of the air conditioner, the viruses, particularly such as pathogenic avian influenza virus and SARS virus are killed and the propagation of the viruses on each member can be prevented.

FIG. 13 is a perspective view of an air conditioner according to another embodiment of the present invention, FIG. 14 is a vertical sectional view of the air conditioner of claim 13, and FIG. 15 is a view illustrating a state where a Kimchi bacteria filter is mounted on an air purifying unit of the air conditioner of FIG. 13;

In this embodiment, parts identical to those of the foregoing embodiment will be assigned with like reference numbers.

Referring to FIGS. 13 through 15, a germicidal air conditioner 100 of this embodiment includes a main body 100, a base 600 coupled to a bottom of the main body 100, and a front door 500 coupled to a front portion of the main body 100.

The main body 100 includes a front frame 200 defining a front-side appearance of the main body 100, a rear frame 300 defining a rear appearance of the main body 100, and a pair of air intake units 400 provided on a lower-both-sides of the front frame 200. The air intake units 400 define a side appearance of the main body 100 and guide the airflow into the main body.

An air purifying unit 550 is disposed in the main body 100 to purify the air through an independent operation.

The front door 500 is mounted on a front portion of the front frame 200. An opening/closing member 530 is pivotally coupled on a central portion of the front door 500 to allow the Kimchi bacteria filter 30 provided in the air purifying unit 550 to be replaced.

Meanwhile, as shown in FIG. 14, the air purifying unit 550 includes a casing 551 forming an additional airflow path in the main body 100 and defining an outer appearance of the main body 100. A purified air exhaust hole 554 communicating with a front surface of the main body 100 is formed on an upper portion of the casing 551. A purified air intake hole 552 is formed on a lower portion of the casing 551.

A blower unit 560 for forcedly directing the air into the casing 551 is disposed in the casing 551. A Kimchi bacteria filter 30 for killing the viruses contained in the air introduced through the purified air intake hole 552 is further provided in the casing 551. At this point, the Kimchi bacteria filter 30 is inserted in a filter receiving portion 558 formed in the casing 551 through a sliding motion. In addition to the Kimchi bacteria filter 30, a purifying filter 580 may further provided in the filter receiving portion 558. The purifying filter 580 may be provided above or below the Kimchi bacteria filter 30. That is, the air may pass through the purifying filter 580 via the Kimchi bacteria filter 30 or pass through the Kimchi bacteria filter 30 via the purifying filter 580. The filter receiving portion 558 may be divided into different sections in which the Kimchi bacterial filter 30 and purifying filter 580 are respectively received. At this point, the Kimchi lactic bacterium zymogenic material may be deposited on coated on the purifying filter 580.

An air exhaust grill 556 may be mounted near the purified air exhaust hole 554 to selectively close or open the purified air exhaust hole 554. The air exhaust grill 556 allows the air exhaust direction to be adjusted according to the user selection.

In addition, the Kimchi lactic bacterium zymogenic material may be coated on the inner surface of the casing 552 or mixed with a material of the casing 551 and injection-molded into the casing 551. That is, the Kimchi lactic bacterium zymogenic material may be contained in the casing 551.

The Kimchi lactic bacterium zymogenic material may be coated on or contained in the blower unit 560 and air exhaust grill 556.

Meanwhile, the Kimchi bacteria filter 30 is mounted in the air purifying unit 550 in a state where the opening/closing member 530 is open. Therefore, the opening/closing member 530 is positioned to correspond to the Kimchi bacterial filter 30.

That is, as shown in FIG. 15, in order to mount the Kimchi bacteria filter 30 in the air purifying unit 550, the opening/closing member 30 is open. Then, the Kimchi bacteria filter 30 is pushed into the filter receiving portion 558. Likewise, the air purifying filter 580 is mounted in the filter receiving portion 558 using the same process.

That is, as the opening/closing member 530 is pivotally provided on the front portion of the main body 100, the Kimchi bacteria filter 30 can be easily mounted in or removed from the air purifying unit 550.

In the present embodiment, although the Kimchi bacteria filter 30 is provided near the purified air intake hole 552, the present invention is not limited to this embodiment. That is, the Kimchi bacteria filter 30 may be provided near the purified air exhaust hole 554.

In order to provide the Kimchi bacteria filter 30 near the purified air exhaust hole 554, the opening/closing member 510 is provided near the purified air exhaust hole 554 and the filter receiving portion 558 is also formed near the purified air exhaust hole 554. In this case, the air introduced into the air purifying unit 550 passes through the Kimchi bacteria filter 30 via the blower unit 560, in the course of which the viruses contained in the air are killed. At this point, the air purifying filter 580 may be provided near either the purified air intake hole 552 or the purified air exhaust hole 554.

FIG. 16 is a perspective view of an air conditioner according to still another embodiment of the present invention and FIG. 17 is a sectional view taken along line. I-I of FIG. 16;

Referring to FIGS. 16 and 17, an air conditioner 700 of the embodiment is a stand type, including a back cover 710, a front cover 720 coupled to a front portion of the back cover 710, a base on which the back and front covers 710 and 720 are disposed and which is provided with a bottom air intake hole 732, a control panel 740 coupled to a front portion of the front cover 720 and provided with a display unit displaying a current operation state, and an air intake panel 750 coupled to a lower portion of the control panel and provided at both side surfaces with air intake holes 752.

A filter 754 for filtering off foreign objects contained in the air is mounted on a rear surface of the air intake panel 750. A front air exhaust hole 724 is formed on a front surface of the front cover 720 and a side exhaust hole 722 is formed on side surfaces of the front cover 720. An air exhaust grill 725 is pivotally mounted in the front air exhaust hole 724 so as to disperse the air being exhausted. Here, the air exhaust grill 725 may be further mounted in the side exhaust holes 722.

In addition, an upper air exhaust hole is formed above the front air exhaust hole 724. An upper air exhaust louver 726 is pivotally mounted in the upper air exhaust hole. A Kimchi bacteria member 770 is mounted on an approximately central portion of the upper air exhaust louver 726 to mix the Kimchi lactic bacterium zymogenic material with the air being exhausted.

Meanwhile, a fan assembly 760 for introducing the indoor air and exhausting the introduced air to the indoor room is provided in the air conditioner 10. In addition, a heat exchanger 780 for allowing the introduced air to be cooled or heated by being heat-exchanged with the refrigerant.

In addition, the fan assembly 760 include a blower fan 762 for introducing the indoor air and a fan housing 764 enclosing the blower fan 762 and provided with air intake and exhaust holes.

In addition, the filter 754 includes a pre-filter for filtering off relatively large-sized foreign objects, a HEPA filter for filtering off fine dusts, and a deodorizing filter for filtering off the offensive smell contained in the air.

The operation of the above-described air conditioner 700 will now be described. When electric power is applied to the air conditioner 700, the fan assembly 760 is driven to introduce the indoor air. That is, the indoor air is introduced through the bottom and side air intake holes 732 and 752. The introduced indoor air by the fan assembly 760 is cooled or heated while passing through the heat exchanger 780.

Meanwhile, the heat-exchanged air is exhausted to the indoor room through the front, side and upper air exhaust holes 724, 722.

Here, the air being exhausted through the upper exhaust hole is mixed with the Kimchi lactic bacterium zymogenic material while passing through the Kimchi bacteria member 770 mounted on the upper air exhaust louver 726.

FIG. 18 is an enlarged perspective view of a state where a Kimchi bacteria member according to the embodiment of the present invention is mounted on an upper air exhaust louver of the air conditioner.

Referring to FIG. 18, the Kimchi bacteria member 770 includes a Kimchi bacteria kit 772 formed on a solid formed of the Kimchi lactic bacterium zymogenic concentration, a case 774 formed on the upper air exhaust louver to receive the Kimchi bacteria kit 772, and a cover 776 for protecting the Kimchi bacteria kit 772.

The case 774 may be integrally injection molded with the upper air exhaust louver 726 or separately formed and assembled with the upper air exhaust louver 726. A guide member for guiding the sliding insertion of the Kimchi bacteria kit 772 may be formed on an inner surface of the case 774. A plurality of grills for allowing the exhaust air to be introduced is arranged on a rear surface of the case 774. A plurality of air exhaust holes are formed inside of the cover 776 so that the air introduced into the case 774 can be effectively exhausted to the indoor room. In order to easily replace the Kimchi bacteria kit 772, the cover 776 may be pivotally coupled to a front portion of the case 774.

FIG. 19 is a perspective view of a modified example of the air conditioner of FIG. 16.

Referring to FIG. 19, an air conditioner of this embodiment is a wall-mounted air conditioner, including a back cover 810 provided at least a side surface with an air exhaust hole 811, a front cover 820 coupled to a front portion of the back cover 810 and provided at an upper portion with an indoor air exhaust hole, and a front panel 830 pivotally coupled to a front surface of the front cover 820. A filter, a heat exchanger and a blower fan are arranged in the air conditioner 800 so that the air passing through the filter can be cooled or heated by being heat-exchanged with the heat exchanger and is then exhausted to the indoor room.

Here, the front panel 830 is smaller than a front area of the front cover 820 and spaced apart from the front portion of the front cover 820. A gap formed at an edge of the front panel 830 becomes an indoor air intake hole 832. Therefore, the indoor air is introduced through the air intake hole 832 formed on the front edge portion of the air conditioner 800 and is then exhausted through side and front-upper air exhaust holes.

In addition, a front air exhaust unit 850 is mounted in a front-upper exhaust hole formed on an upper portion of the front cover 820. The Kimchi bacteria member 860 is mounted on the front air exhaust unit 850. In addition, the Kimchi bacteria member 860 may be formed as shown in FIGS. 17 through 19.

The front air exhaust unit 850 is pivotally mounted and the front panel 830 covers the front surface 820 of the front cover 820 except for the front air exhaust unit 850. In a state where the air conditioner 800 does not operate, the front air exhaust unit 850 closes the air exhaust hole. When the air conditioner 800 operates, the front air exhaust unit 850 opens the air exhaust hole.

FIG. 20 is a perspective view of a modified example of the air conditioner of FIG. 16.

Referring to FIG. 20, an air conditioner of this embodiment is a wall-mounted air conditioner, including a cabinet 910 defining an outer appearance, a heat exchanger 920 mounted in the cabinet 910, a blower fan 930 mounted on a lower portion of the heat exchanger 920, a Kimchi bacteria kit 960 contacting the air introduced and exhausted by the blower fan 930 to allow the Kimchi lactic bacterium zymogenic material to be mixed with the air.

The cabinet 910 is provided at upper and front portions with upper and front air intake holes 912 and 914, respectively. A louver grill may be mounted in the air intake hole 912, 914. The cabinet 910 is further provided at a lower portion with an air exhaust hole 916 for exhausting the air that is cooled or heated while passing through the heat exchanger 920 to the indoor room. The air exhaust hole 916 is selectively opened and closed by the air exhaust louver 917.

The air exhaust louver 917 is pivotally mounted on the cabinet 910 to selectively open and close the air exhaust hole 916. One or more air exhaust louvers 917 may be provided.

An air guide 940 for guiding the flow of the air that is being exhausted is mounted in the cabinet 910. The air guide 940 is mounted on an inner wall of the heat exchanger 920 or the cabinet 910 and is curved at a predetermined curvature so that the air can be exhausted without receiving any frictional force.

A plurality of heat exchangers 920 are formed above the blower fan 930 while enclosing the upper portion of the blower fan 930. Therefore, the air introduced by the blower fan 930 passes through the heat exchangers 920. The air guide 940 is mounted near the rear-inner circumference of the cabinet 910 in rear of the blower fan 930. Therefore, the air exhausted along the inner circumference of the blower fan 930 can be guided to the air exhaust hole 916 without receiving any frictional resistance.

Meanwhile, A seating groove 942 on which the Kimchi bacteria kit 960 seats is formed at a located spaced upward apart from an end portion of the air guide 940. The Kimchi bacteria kit 960 is detachably mounted in the seating groove 942 so that it can be easily replaced.

The air guided by the air guide 940 passes through the Kimchi bacterial kit 960, in the course of which the Kimchi lactic bacterium zymogenic material is mixed with the air. The air mixed with the Kimchi lactic bacterium zymogenic material is exhausted to the indoor room.

A pre-filter and/or a HEPA filter, and/or a dust collection filter may be mounted near the front air intake hole 914 and the upper air intake hole 912.

FIG. 21 is a perspective view of a modified example of the air conditioner of FIG. 20.

Referring to FIG. 21, in this example, the Kimchi bacteria member 1000 is separately provided on an outer side of the air conditioner 900.

When the Kimchi bacterial member is mounted in the air conditioner 900, the Kimchi lactic bacterium zymogenic material is not discharged unless the air conditioner does not operated.

However, according to this example, since the Kimchi bacteria member 1000 are associated with a fan and separately mounted from the air conditioner 900, the Kimchi lactic bacterium zymogenic material can be discharged to the air even when the air conditioner does not operated.

Meanwhile, the Kimchi bacteria member 1000 includes a case 1010 for mounting the Kimchi bacteria kit 1060, a cover mounted on a front portion of the case 1010 and provided with an exhaust hole, a sub-fan 1030 mounted on a rear portion of the case 1010 to introduce the indoor air.

Air intake holes 1050 are formed on both side surfaces of the case 1010 so that the indoor air passes through the Kimchi bacteria kit 1060 even when the blower fan 930 does not operate.

By the above-described structure, in spring and fall seasons the air conditioner 900 is not generally operated, only the Kimchi bacteria member 1000 can be operated. Thus, the Kimchi lactic bacterium zymogenic material can be always contained in the air to prevent the viruses such as pathogenic avian influenza virus or the SARS virus from being contained in the air.

The Kimchi bacteria member 1000 may be detachably mounted on a front portion of the air conditioner 900.

It will be apparent to those skilled in the art that various modifications and variations can be made in the present invention. Thus, it is intended that the present invention covers the modifications and variations of this invention provided they come within the scope of the appended claims and their equivalents.

INDUSTRIAL APPLICABILITY

According to the inventive air conditioner, the germs and viruses contained in the air circulating the air conditioner can be killed by the Kimchi lactic bacterium zymogenic material and the germs and viruses cannot propagate in the air conditioner. Therefore, the air conditioner of the present invention is applicable to the industry.

The invention claimed is:

1. An air conditioner comprising:
   a main body formed by a plurality of members assembled with each other; and
   an air passage along which air introduced into the main body flows,
   wherein at least one of the members includes a Kimchi lactic bacterium zymogenic material formed on a portion of the member, which contacts the air flowing along the air passage.

2. The air conditioner according to claim 1, wherein the Kimchi lactic bacterium zymogenic material is coated on a surface of the member.

3. The air conditioner according to claim 1, wherein the Kimchi lactic bacterium zymogenic material is contained in the member.

4. The air conditioner according to claim 3, wherein the Kimchi lactic bacterium zymogenic material is mixed with a main material of the member and is integrally molded together with the member through an ejection or injection molding process.

5. The air conditioner according to claim 3, wherein the Kimchi lactic bacterium zymogenic material is contained in a Kimchi molded member that is molded by a material containing a main material and the Kimchi lactic bacterium zymogenic material,
   wherein the member is separately molded from the Kimchi molded member and combined with the Kimchi molded member.

6. The air conditioner according to claim 1, wherein the Kimchi lactic bacterium zymogenic material is fully or partly contained in the member.

7. The air conditioner according to claim 1, wherein the Kimchi lactic bacterium zymogenic material is selected from the group consisting of *Leucconostoc* genus Kimchi bacteria, *Lactobacillus* genus Kimchi bacteria, *Weissella* genus Kimchi bacteria, and a combination thereof.

8. The air conditioner according to claim 1, wherein the Kimchi lactic bacterium zymogenic material is 0.001-20 w % with respect to the 100 w % of the member.

9. The air conditioner according to claim 1, wherein the member is a filter that can be coupled to other members.

10. The air conditioner according to claim 1, wherein the member is a front door defining a front portion of the main body.

11. The air conditioner according to claim 1, wherein the member is a base defining a bottom of the main body.

12. The air conditioner according to claim 1, wherein the member is at least one of a front door, rear frame and air intake unit that define an outer appearance of the main body.

13. The air conditioner according to claim 1, wherein the member is a heat exchanger for performing a heat exchange between air introduced and a refrigerant or a drain unit for reserving condensed water.

14. The air conditioner according to claim 1, wherein the member is a blower unit for introducing air into the main body and exhaust the air out of the main body.

15. The air conditioner according to claim 1, wherein the member is an air intake vane provided in an air intake hole or an air exhaust vane provided in an air exhaust hole.

16. The air conditioner according to claim 1, wherein the member is an air purifying unit provided on a passage separated from the air passage to purify the air.

17. The air conditioner according to claim 1, wherein the member is a Kimchi bacteria kit provided inside or outside of the main body in the form of a solid state in which the Kimchi lactic bacterium zymogenic material is concentrated.

18. An air conditioner comprising:
   a main body formed by a plurality of members assembled with each other;
   an air passage along which air introduced into the main body flows; and
   a Kimchi bacteria filter provided on the air passage to kill viruses contained in the air flowing along the air passage, the Kimchi bacteria filter containing a Kimchi lactic bacterium zymogenic material.

19. The air conditioner according to claim 18, wherein the Kimchi bacteria filter is detachably mounted on the member.

20. The air conditioner according to claim 18, wherein the member is provided with a guide along which the Kimchi bacteria filter is mounted through a sliding motion.

21. The air conditioner according to one of claims 19 and 20, wherein the member is at least one selected from the group consisting of a base defining a bottom of the main body, an air intake unit for introducing the air into the main body, a blower unit for forcedly introducing the air into the main body, a dust collection unit for removing dusts contained in the air introduced into the main body using discharge, an air purifying unit formed on a passage separated from the air passage to purify the air.

22. The air conditioner according to claim 18, wherein the Kimchi bacteria filter has a net structure such as a honeycomb or a luffa.

23. The air conditioner according to claim 18, wherein the Kimchi bacteria filter is a filter on which a Kimchi lactic bacterium zymogenic material is coated or deposited.

24. An air conditioner comprising:
   a main body provided with an air intake hole and an air exhaust hole;
   a blower unit mounted in the main body to introduce or exhaust;
   a heat exchanger for allowing the air introduced by the blower unit to be heat-exchanged with refrigerant; and
   a Kimchi bacteria member installed inside or outside of the main body to discharge a Kimchi lactic bacterium zymogenic material.

25. The air conditioner according to claim 24, wherein the Kimchi bacteria member is a filter that can be coupled to one of members forming the main body.

26. The air conditioner according to claim 24, wherein the Kimchi bacteria member is installed near the air exhaust hole.

27. The air conditioner according to claim 24, wherein the Kimchi bacteria member is installed on the air passage along which the air is exhausted.

28. The air conditioner according to claim 24, wherein the Kimchi bacteria member comprises:
   a Kimchi bacteria kit formed in a solid state in which the Kimchi lactic bacterium zymogenic material is concentrated;
   a case for receiving the Kimchi bacteria kit; and
   a cover pivotally or detachably mounted on a front portion of the case.

29. The air conditioner according to claim 24, wherein the Kimchi bacteria member comprises:
   a case mounted on an outer side of the main body;
   a Kimchi bacteria kit formed in a solid state in which the Kimchi lactic bacterium zymogenic material is concentrated, the Kimchi bacteria kit being mounted in the case;
   a sub-fan mounted in the case; and
   a cover pivotally or detachably mounted on the case.

30. The air conditioner according to any one of claims 24 and 25, wherein the Kimchi bacteria kit is replaceable.

* * * * *